US012628244B2

(12) United States Patent
Kapale et al.

(10) Patent No.: US 12,628,244 B2
(45) Date of Patent: May 12, 2026

(54) METHODS AND SYSTEMS FOR MANAGING EMERGENCY INDICATIONS AND EMERGENCY STATE OF MCPTT CLIENTS/GROUP

(71) Applicant: Samsung Electronics Co., Ltd., Suwon-si (KR)

(72) Inventors: Kiran Gurudev Kapale, Bangalore (IN); Arunprasath Ramamoorthy, Bangalore (IN); Sapan Pramodkumar Shah, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 18/020,796

(22) PCT Filed: Aug. 12, 2021

(86) PCT No.: PCT/KR2021/010725
§ 371 (c)(1),
(2) Date: Feb. 10, 2023

(87) PCT Pub. No.: WO2022/035251
PCT Pub. Date: Feb. 17, 2022

(65) Prior Publication Data
US 2023/0309190 A1 Sep. 28, 2023

(30) Foreign Application Priority Data

Aug. 12, 2020 (IN) .............................. 202041034730
Jun. 9, 2021 (IN) .............................. 2020 41034730

(51) Int. Cl.
*H04W 4/00* (2018.01)
*H04W 76/45* (2018.01)
*H04W 76/50* (2018.01)

(52) U.S. Cl.
CPC ........... *H04W 76/45* (2018.02); *H04W 76/50* (2018.02)

(58) Field of Classification Search
CPC ..... H04W 76/45; H04W 76/50; H04W 88/18; H04W 4/08; H04W 4/10; H04W 4/90
See application file for complete search history.

(56) References Cited

U.S. PATENT DOCUMENTS 6,188,882 B1 * 2/2001 Tarkiainen .............. H04W 4/90
455/518
2017/0142756 A1 5/2017 Lee
(Continued)

FOREIGN PATENT DOCUMENTS

KR 10-1999-0008227 A 1/1999
KR 10-2020-0052172 A 5/2020
WO 2018-192656 A1 10/2018

OTHER PUBLICATIONS

3GPP; TSG CT; Mission Critical Push to Talk (MCPTT) call control; Protocol specification (Release 16), 3GPP TS 24.379 V16. 5.0, Jul. 10, 2020.
(Continued)

*Primary Examiner* — Omoniyi Obayanju
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides methods and systems for
(Continued)

managing emergency indications and emergency state of MCPTT clients.

20 Claims, 5 Drawing Sheets

(56) References Cited

U.S. PATENT DOCUMENTS

2017/0289776 A1\*  10/2017  Kim ........................ H04W 4/10
2020/0205223 A1\*  6/2020  Maginity ................ H04L 69/28
2021/0144536 A1  5/2021  Wanstedt et al.

OTHER PUBLICATIONS

'3GPP; TSG SA; Functional architecture and information flows to support Mission Critical Push to Talk (MCPTT); Stage 2 (Release 17)', 3GPP TS 23.379 V17.3.2, Jul. 13, 2020.
'3GPP; TSG SA; Mission Critical Services Common Requirements (MCCoRe); Stage 1 (Release 17)', 3GPP TS 22.280 V17.3.0, Jul. 11, 2020.
Indian Office Action dated May 25, 2022, issued in an Indian Application No. 202041034730.
Korean Office Action dated Nov. 30, 2025, issued in Korean Application No. 10-2023-7007912.

\* cited by examiner

[Fig. 1]
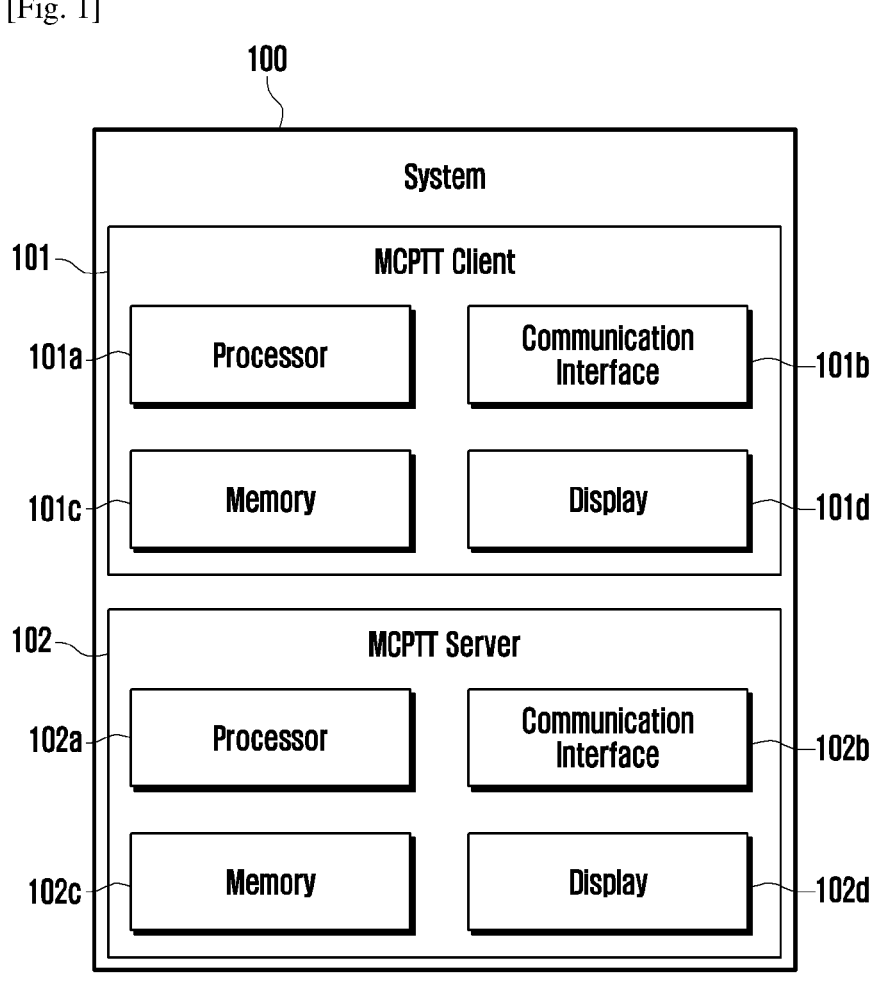

[Fig. 2]
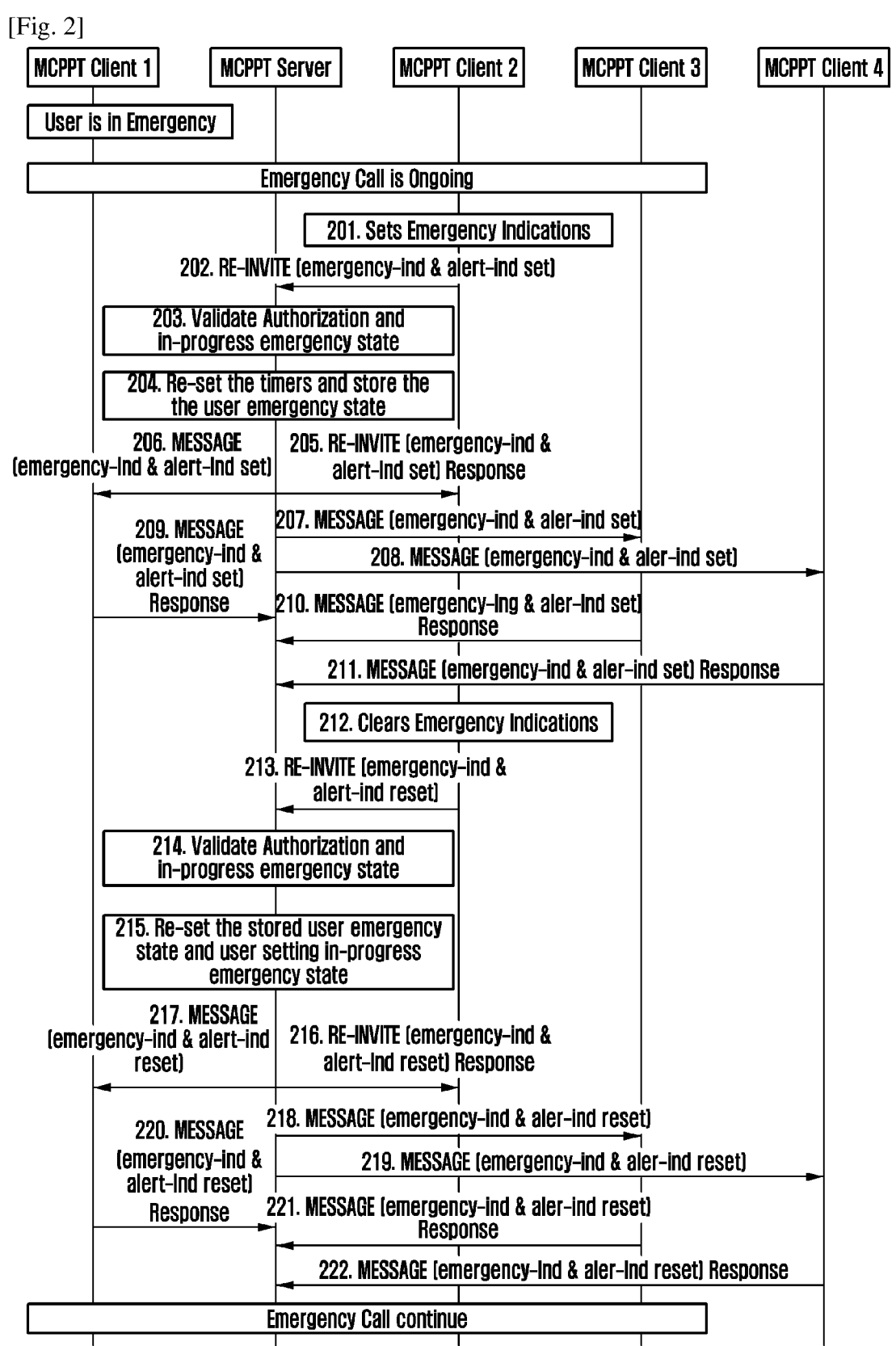

[Fig. 3]

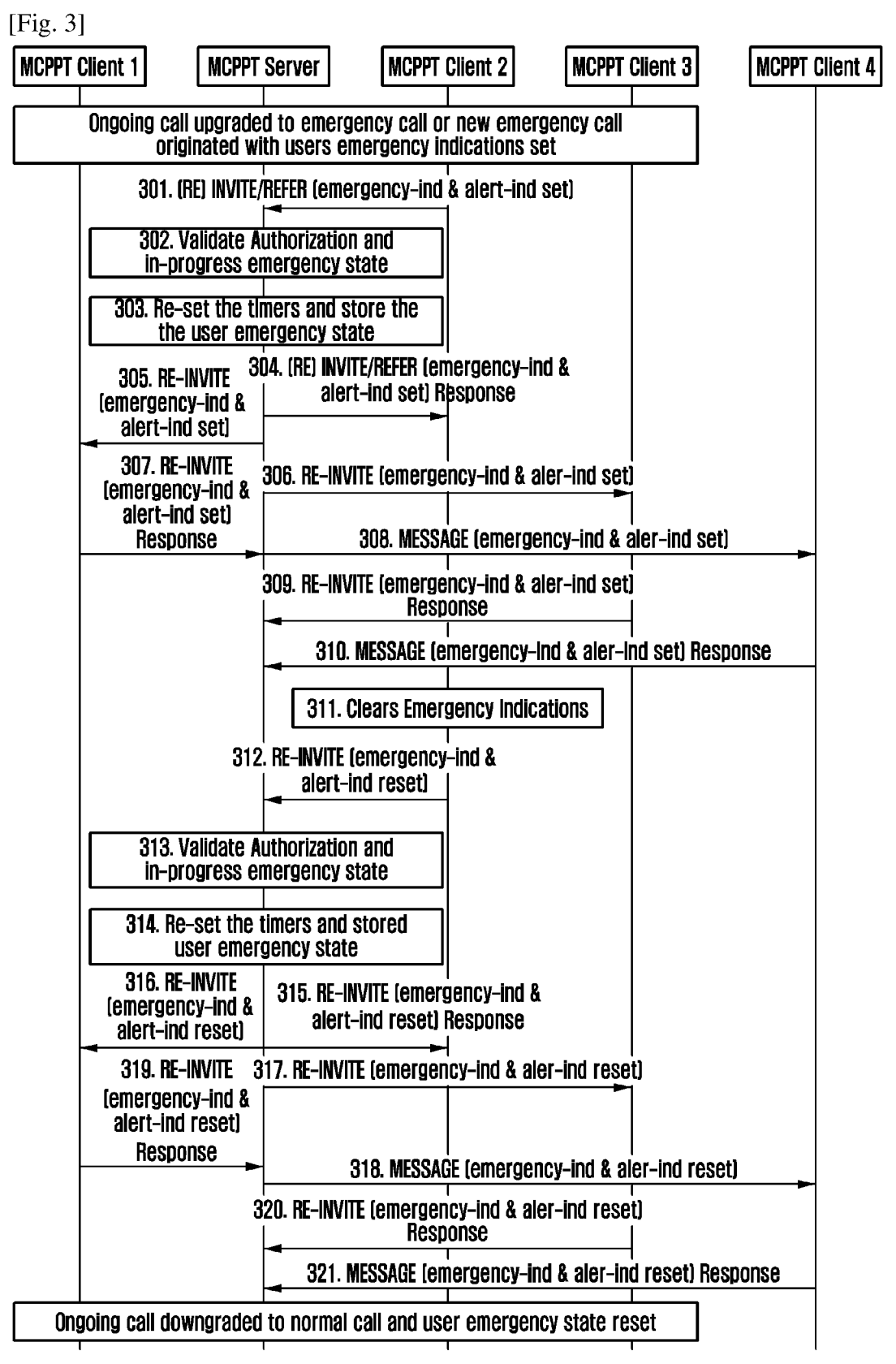

| MCPPT Client 1 | MCPPT Server | MCPPT Client 2 | MCPPT Client 3 | MCPPT Client 4 |

Ongoing call upgraded to emergency call or new emergency call originated with users emergency indications set 301. (RE) INVITE/REFER (emergency-ind & alert-ind set)

302. Validate Authorization and in-progress emergency state

303. Re-set the timers and store the the user emergency state 304. (RE) INVITE/REFER (emergency-ind & alert-ind set) Response 305. RE-INVITE (emergency-ind & alert-ind set)

306. RE-INVITE (emergency-ind & aler-ind set)

307. RE-INVITE (emergency-ind & alert-ind set) Response

308. MESSAGE (emergency-ind & aler-ind set)

309. RE-INVITE (emergency-ind & aler-ind set) Response

310. MESSAGE (emergency-ind & aler-ind set) Response

311. Clears Emergency Indications

312. RE-INVITE (emergency-ind & alert-ind reset)

313. Validate Authorization and in-progress emergency state

314. Re-set the timers and stored user emergency state

315. RE-INVITE (emergency-ind & alert-ind reset) Response

316. RE-INVITE (emergency-ind & alert-ind reset)

317. RE-INVITE (emergency-ind & aler-ind reset)

319. RE-INVITE (emergency-ind & alert-ind reset) Response

318. MESSAGE (emergency-ind & aler-ind reset)

320. RE-INVITE (emergency-ind & aler-ind reset) Response

321. MESSAGE (emergency-ind & aler-ind reset) Response

Ongoing call downgraded to normal call and user emergency state reset

[Fig. 4]

| MCPPT Client 1 | MCPPT Server | MCPPT Client 2 | MCPPT Client 3 | MCPPT Client 4 |
|---|---|---|---|---|

User has outstanding emergency conditions

In-progress emergency state of the group but no ongoing communication

Authorized user clears Emergency (in-progress Emergency State of group and optionally user's emergency state)

401. MESSAGE (emergency-ind & alert-ind reset)

402. Validate authorization and in-progress emergency state

403. Re-set the stored user's emergency state and group in-progress state

404. MESSAGE (emerge4cy-ind & & alert-ind reset) Response

406. MESSAGE (emergency-ind & alert-ind reset)

405. MESSAGE (emergency-ind & alert-ind reset)

408. MESSAGE (emergency-ind & alert-ind reset) Respone

407. MESSAGE (emergency-ind & aler-ind reset)

409. MESSAGE (emergency-ind & alert-ind reset) Response

410. MESSAGE (emergency-ind & aler-ind reset) Response

[Fig. 5]

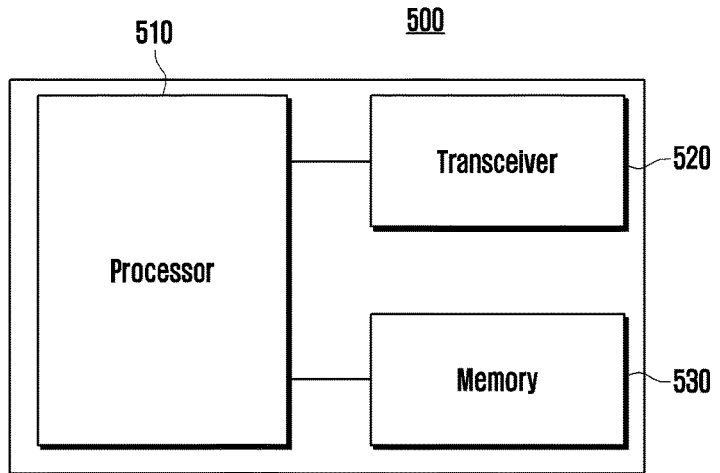

510

500

Processor

Transceiver — 520

Memory — 530

[Fig. 6]
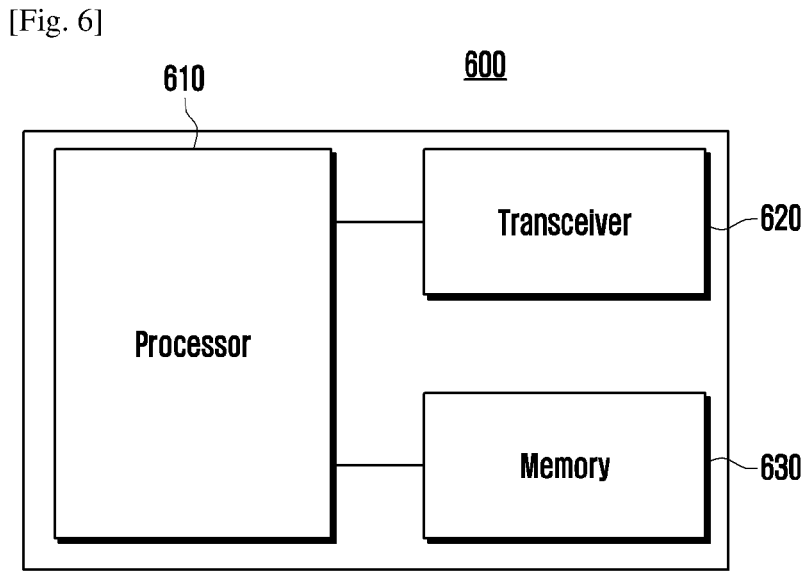

METHODS AND SYSTEMS FOR MANAGING EMERGENCY INDICATIONS AND EMERGENCY STATE OF MCPTT CLIENTS/GROUP

TECHNICAL FIELD

Embodiments herein relate to Mission Critical Push to Talk (MCPTT) services, and more particularly to methods and systems for managing emergency indications received from MCPTT clients of an MCPTT group and managing in-progress emergency state of the MCPTT group.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Continuous growth and development in wireless telecommunication systems has allowed users to avail emergency services. 3$^{rd}$ Generation Partnership Project (3GPP) has introduced Mission Critical Push to Talk (MCPTT) services, to allow users, such as personnel involved in mission critical communications or first responders, to effectively avail emergency services. The mission critical services are generally availed in performing operations that are associated with preventing loss of human life and/or property. The mission critical services can be relevant, especially for agencies providing public safety and health services such as, police services, fire services, and ambulance services. Therefore, in order to cater to emergency situations, as experienced by the agencies providing the public safety and health services, the mission critical services needs to be rendered with a high degree of reachability, availability, reliability, Quality of Service (QoS), and so on.

DISCLOSURE OF INVENTION

Technical Problem

The principal object of the embodiments herein is to disclose methods and systems for handling emergency indications from at least one Mission Critical Push to Talk (MCPTT) client of an MCPTT group, wherein MCPTT clients of the MCPTT group may be engaged in an MCPTT emergency group call.

Another object of the embodiments herein is to detect an emergency indication from an MCPTT client of the MCPTT group, and alert all MCPTT clients of the MCPTT group, engaged in an MCPTT group call, about the emergency indication from the MCPTT client; wherein the status of the MCPTT group call is updated to an MCPTT emergency group call on detecting, from the MCPTT client of the MCPTT group, the emergency indication.

Another object of the embodiments herein is to inform at least one MCPTT client of the MCPTT group about the indication of emergency by the MCPTT client of the MCPTT group and the update in the status of the MCPTT group call to MCPTT emergency group call, wherein the informed at least one MCPTT client of the MCPTT group are not engaged in the MCPTT emergency group call.

Another object of the embodiments herein is to detect an emergency indication from an MCPTT client of the MCPTT group, and alert MCPTT clients of the MCPTT group about the emergency indication from the MCPTT client, wherein an MCPTT emergency group call is initiated on detecting the emergency indication from the MCPTT client.

Another object of the embodiments herein is to inform at least one MCPTT client of the MCPTT group about the indication of emergency, by the MCPTT client of the MCPTT group, during the initiation of the MCPTT emergency group call, wherein the informed at least one MCPTT client of the MCPTT group are not engaged in the initiated MCPTT emergency group call.

Another object of the embodiments herein is to detect an emergency indication, from an MCPTT client of the MCPTT group, while the MCPTT clients of the MCPTT group are engaged in an MCPTT emergency group call, and alert all MCPTT clients of the MCPTT group, engaged in the MCPTT emergency group call, about the emergency indication from the MCPTT client.

Another object of the embodiments herein is to inform at least one MCPTT client of the MCPTT group about the indication of emergency, by the MCPTT client of the MCPTT group, while all MCPTT clients of the MCPTT group are engaged in the MCPTT emergency group call, wherein the informed at least one MCPTT client of the MCPTT group are not engaged in the ongoing MCPTT emergency group call.

Another object of the embodiments herein is to cancel an in-progress emergency state of the MCPTT group, if it is detected that the ongoing MCPTT emergency group call is terminated or there is no communication ongoing amongst the MCPTT clients of the MCPTT group through the MCPTT emergency group call.

Another object of the embodiments herein is to inform all MCPTT users of the MCPTT group, involved in the MCPTT emergency group call, and at least one MCPTT client of the MCPTT group, not involved in the MCPTT emergency group call, about the cancellation of the in-progress emergency status of the MCPTT group.

Solution to Problem

Accordingly, an embodiment according to the disclosure provides a method performed by a mission critical push to talk (MCPTT) server in a wireless communication system, the method including: receiving, from a first MCPTT terminal, a first message including a first emergency indication of the first MCPTT terminal; receiving, from a second MCPTT terminal, a second message including a second emergency indication of the second MCPTT terminal, while an MCPTT group including the first MCPTT terminal and the second MCPTT terminal is in an in-progress emergency state based on the first emergency indication; and transmitting, to at least one MCPTT terminal among the MCPTT group, a third message notifying the second emergency indication of the second MCPTT terminal, wherein MCPTT IDs of the first terminal and the second MCPTT terminal are cached.

The method includes transmitting, to a third MCPTT terminal, a fourth message notifying the second emergency indication of the second MCPTT terminal, wherein the third MCPTT terminal is not included in the MCPTT group.

The method includes receiving, from the second MCPTT terminal, a fifth message indicating to reset the second emergency indication; and transmitting, to the at least one MCPTT terminal among the MCPTT group, a sixth message notifying the second emergency indication to be reset.

The method includes receiving, from a fourth MCPTT terminal among the MCPTT group, a seventh message requesting to cancel the in-progress emergency state, in case that there is no ongoing communication associated with the in-progress emergency state; identifying whether a request of the seventh message is authorized; clearing the cached MCPTT ID of the first terminal and transmitting an eighth message indicating to reset the first emergency indication to the at least one MCPTT terminal among the MCPTT group, in case that the request of the seventh message is authorized; and rejecting the request of the seventh message, in case that the request of the seventh message is not authorized.

Accordingly, the embodiments provide methods and systems for managing emergency indications from Mission Critical Push to Talk (MCPTT) clients of an MCPTT group and managing in-progress emergency status of the MCPTT group. In an embodiment, the emergency indications are detected from the MCPTT clients of the MCPTT group, if the MCPTT clients of the MCPTT group are engaged in an MCPTT emergency group call. In another embodiment, the emergency indications can be detected from the MCPTT clients of the MCPTT group, if the MCPTT clients of the MCPTT group are not engaged in any MCPTT emergency group call or if the MCPTT clients of the MCPTT group are engaged in a normal MCPTT group call. In an embodiment, the in-progress emergency status of an MCPTT group can be cancelled explicitly, if the MCPTT emergency group call has terminated or if there is no ongoing communication between the MCPTT clients of the MCPTT group through the MCPTT emergency group call.

The embodiments include detecting an emergency indication from an MCPTT client of the MCPTT group. On detecting the emergency indication, the embodiments include alerting all MCPTT clients of the MCPTT group, engaged in a normal MCPTT group call, about the emergency indication from the MCPTT client. The embodiments include upgrading of the normal MCPTT group call to an MCPTT emergency group call on detecting the emergency indication from the MCPTT client. The embodiments include informing at least one MCPTT client of the MCPTT group about the indication of emergency by the MCPTT client of the MCPTT group, and the upgrading of the normal MCPTT group call to MCPTT emergency group call. The embodiments include informing the at least one MCPTT client about the indication of emergency by the MCPTT client of the MCPTT group and the upgrading of the normal MCPTT group call to the MCPTT emergency group call, if the at least one MCPTT client is not engaged in the MCPTT emergency group call.

The embodiments include detecting an indication of emergency, from an MCPTT client of the MCPTT group and initiating an MCPTT emergency group call on the detecting the emergency indication from the MCPTT client of the MCPTT group. The embodiments include issuing alerts to all MCPTT clients of the MCPTT group about the emergency indication from the MCPTT client. The embodiments include detecting at least one MCPTT client of the MCPTT group not engaged in the MCPTT emergency group call. The embodiments include informing the detected at least one MCPTT client of the MCPTT group about the indication of emergency, by the MCPTT client of the MCPTT group, after the initiation of the MCPTT emergency group call.

The embodiments include detecting an emergency indication, from an MCPTT client of the MCPTT group, while the MCPTT clients of the MCPTT group are engaged in an MCPTT emergency group call. The embodiments include alerting all MCPTT clients of the MCPTT group, engaged in the MCPTT emergency group call, about the emergency indication from the MCPTT client. The embodiments include detecting at least one MCPTT client of the MCPTT group not engaged in the ongoing MCPTT emergency group call. The embodiments include informing the detected at least one MCPTT client of the MCPTT group about the indication of the emergency, by the MCPTT client of the MCPTT group, while all the MCPTT clients of the MCPTT group were engaged in the ongoing MCPTT emergency group call.

The embodiments include determining whether an ongoing MCPTT emergency group call has been terminated, or whether there is an ongoing communication amongst the MCPTT clients of the MCPTT group through the MCPTT emergency group call. If it is determined that the MCPTT emergency group call has been terminated, or there is no ongoing communication amongst the MCPTT clients of the MCPTT group through the MCPTT emergency group call, the embodiments include cancelling in-progress emergency status of the MCPTT group. The embodiments include informing all MCPTT users of the MCPTT group, which were involved in the MCPTT emergency group call, and at least one MCPTT client of the MCPTT group, that were not involved in the MCPTT emergency group call, about the cancellation of the in-progress emergency status of the MCPTT group.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

Embodiments herein are illustrated in the accompanying drawings, through out which like reference letters indicate corresponding parts in the various figures. The embodiments herein will be better understood from the following description with reference to the drawings, in which:

FIG. 1 depicts a system that is configured to manage emergency indications from Mission Critical Push to Talk (MCPTT) clients of an MCPTT group and managing in-progress emergency state of the MCPTT group, according to embodiments as disclosed herein;

FIG. 2 is an example sequence diagram depicting the management of emergency state of an MCPTT client of an MCPTT group, whilst the MCPTT group is in the in-progress emergency state, according to embodiments as disclosed herein;

FIG. 3 is an example sequence diagram depicting the reporting of emergency state of an MCPTT client and in-progress emergency state of the MCPTT group to another MCPTT client of the MCPTT group that is not participating in an MCPTT emergency group call, according to embodiments as disclosed herein; and FIG. 4 is an example sequence diagram depicting the explicit cancelling of in-progress emergency state of the MCPTT group on detecting that there is no active communication between the MCPTT clients of the MCPTT group using an established MCPTT emergency group call, according to embodiments as disclosed herein.

FIG. 5 illustrates a terminal according to embodiments of the present disclosure.

FIG. 6 illustrates an MCPTT server according to embodiments of the present disclosure.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mission critical services are critical to an operation, and any disruption or failure in the mission critical services may disrupt the operation altogether. As the mission critical services are regarded as critical to the operation, disruptions and/or failures with respect to reception of the data pertaining to mission critical services may be catastrophic and probably lead to fatalities. MCPTT services allow MCPTT users to create groups and trigger MCPTT calls. The MCPTT calls usually involve a number of participants (MCPTT users) communicating in a group, wherein one or more participants can get into an emergency state (and declare emergency) and require immediate assistance.

As specified in 3GPP specifications, when an MCPTT user (MCPTT client) gets into an emergency condition, the MCPTT client can initiate an MCPTT emergency group call or upgrade the status of an ongoing MCPTT group call (amongst the MCPTT clients in the MCPTT group) to an emergency group call. An indication is provided to the MCPTT clients of the affiliated MCPTT group regarding declaration of the emergency (through the initiation of the MCPTT call) or the upgrading of the status of the ongoing MCPTT group call. An MCPTT client in the MCPTT emergency state gains elevated access privileges for all of the MCPTT client's mission critical application s and the MCPTT group is considered to be in an in-progress emergency state until the emergency status is cancelled.

An MCPTT server configures priorities of all underlying bearers for each of the MCPTT clients (participants) in the MCPTT group. The successive MCPTT calls during the MCPTT group's in-progress emergency state can be allocated priorities that have been adjusted based on bearer priority (due to the in-progress emergency state of the MCPTT group). The termination of MCPTT emergency group call may not cancel the in-progress emergency state of the MCPTT group. The emergency state of the MCPTT group needs to be explicitly cancelled by an authorized user using a dedicated procedure. Currently, the 3GPP specifications does not define any procedure to handle circumstances in which, multiple MCPTT users (clients or participants) of an MCPTT group indicate emergency (the participants can provide indications in a request), notifying other participants of the MCPTT group about the emergency condition of multiple MCPTT participants of the MCPTT group and canceling an in-progress emergency state of the MCPTT group after the MCPTT emergency call is terminated at the ends of the MCPTT clients (participants) and at the end of the MCPTT server.

Embodiments herein disclose methods and systems for managing emergency indications from Mission Critical Push to Talk (MCPTT) clients of an MCPTT group and managing in-progress emergency status of the MCPTT group. The embodiments include detecting an emergency indication from an MCPTT client of the MCPTT group. The embodiments include detecting the emergency indication while other MCPTT clients of the MCPTT group are engaged in an MCPTT emergency group call. The embodiments include informing the other MCPTT clients of the MCPTT group, engaged in the MCPTT emergency group call, about the indication of emergency from the MCPTT client. The embodiments include informing the other MCPTT clients of the MCPTT group, not engaged in the MCPTT emergency group call, about the indication of emergency from the MCPTT client.

The embodiments include detecting the emergency indication from the MCPTT client of the MCPTT group while other MCPTT clients of the MCPTT group are engaged in a normal MCPTT group call. The embodiments include updating the status of the normal MCPTT group call to an MCPTT emergency group call. The embodiment s include informing the other MCPTT clients of the MCPTT group, engaged in the normal MCPTT group call, about the indication of emergency from the MCPTT client and the updating of the status of the normal MCPTT group call to an MCPTT emergency group call. The embodiments include informing at least one MCPTT client of the MCPTT group, not engaged in the normal MCPTT group call, about the indication of emergency from the MCPTT client and the updating of the status of the normal MCPTT group call to an MCPTT emergency group call.

The embodiments include detecting the emergency indication from the MCPTT client of the MCPTT group and allow initiation of an MCPTT emergency group call. The embodiments include informing the other MCPTT clients of the MCPTT group about the indication of emergency from the MCPTT client. The embodiments include informing at least one MCPTT client of the MCPTT group, not engaged in the initiated MCPTT emergency group call, about the indication of emergency from the MCPTT client and the initiation of the MCPTT emergency group call.

The embodiments include detecting that an MCPTT group is in in-progress emergency state. This can indicate that at least one MCPTT client of the MCPTT group is in an emergency state and has initiated an MCPTT emergency group call. The embodiments include determining whether the MCPTT emergency group call has terminated or whether there is communication between the MCPTT clients of the MCPTT group using the MCPTT emergency group call. The embodiments include cancelling the in-progress emergency status of the MCPTT group on determining that either the MCPTT emergency group call has terminated or there is no communication ongoing between the MCPTT clients of the MCPTT group using the MCPTT emergency group call. The embodiments include informing the MCPTT clients of the MCPTT group about the cancellation of the in-progress emergency status of the MCPTT group.

Referring now to the drawings, and more particularly to FIGS. 1 through 4, where similar reference characters denote corresponding features consistently throughout the figures, there are shown preferred embodiments.

FIG. 1 depicts a system 100 configured to manage emergency indications from MCPTT clients of an MCPTT group and managing the in-progress emergency state of the MCPTT group, according to embodiments as disclosed herein. As depicted in FIG. 1, the system 100 comprises plurality MCPTT clients 101, and an MCPTT server 102. For ease of depiction, a single MCPTT client 101 has been depicted. The system 100 may include a plurality of MCPTT clients (101), including a coordinator MCPTT client (101). In an embodiment, the coordinator MCPTT client (101) sends/receives emergency indications from other MCPTT clients (101) of the system (101) and can indicate, to the MCPTT server 102, whether emergency indications need to be approved or emergency status of the MCPTT clients (101) needs to be cancelled. The plurality of MCPTT clients (101) can be a part of a single MCPTT group or multiple MCPTT groups. For simplicity, the plurality of MCPTT clients (101) is considered to be a part of a single MCPTT group.

The MCPTT client 101 (each of the plurality of MCPTT clients) can include a processor 101a, a communication interface 101b, a memory 101c, and a display 101d. The MCPTT server 102 can include a processor 102a, a communication interface 102b, a memory 102c, and a display 102d. Examples of the MCPTT client 101 include, but not limited to, a smart phone, a laptop, a desktop, a hand-held device, a wearable device, an Internet of Things (IoT) device, a device in-built in a vehicle, and so on.

In an embodiment, consider that the MCPTT client (101), amongst the plurality of MCPTT clients (101) of the MCPTT group, had earlier sent emergency indications to the MCPTT server 102. The MCPTT client (101), and other MCPTT clients (101) of the MCPTT group, including the MCPTT client 101, is engaged in an MCPTT emergency group call, and the MCPTT group is in the in-progress emergency state. In this scenario, consider that the MCPTT client 101 has declared emergency. The MCPTT server 102 can receive (detect) an emergency indication from the MCPTT client 101. The MCPTT server 102 receives the emergency indication while the MCPTT client (101) (had declared being in emergency earlier) and the other MCPTT clients (101) are engaged in the MCPTT emergency group call. The MCPTT server 102 is configured to validate the authorization of the MCPTT client 101 to send the emergency indication. The MCPTT server 102 can send a response to the MCPTT client 101 (had currently declared emergency), about the authorization of the emergency indication, and in-progress emergency state of the MCPTT group.

The MCPTT server 102 is configured to inform the other MCPTT clients (101) of the MCPTT group, engaged in the MCPTT emergency group call, about the indication of emergency and the authorization of the emergency indication. The MCPTT server 102 can inform at least one MCPTT client (101) of the MCPTT group, which is (are) not engaged in the MCPTT emergency group call, about the indication of emergency from the MCPTT client 101 and the authorization of the emergency indication.

Consider that the MCPTT client 101 is no longer in emergency. The MCPTT client 101 can send an indication to the MCPTT server 102 to clear the emergency state of the MCPTT client 101. The MCPTT server 102 can receive the indication from the MCPTT client 101, and determine whether to clear the emergency state of the MCPTT client 101. The MCPTT server 102 can be configured to determine whether the MCPTT client 101 is authorized to send indications to clear the in-progress emergency state of the MCPTT group. If the MCPTT client 101 is determined to be authorized, the MCPTT server 102 can cancel the emergency state of the MCPTT client 101 or the MCPTT group. Further, the MCPTT server 102 can send a response to the MCPTT client 101 to indicate about the cancelling of the emergency state of the MCPTT client 101.

The MCPTT server 102 is configured to inform the other MCPTT clients (101) of the MCPTT group, which are engaged in the MCPTT emergency group call, about the clearing of the emergency state of the MCPTT client 101. The MCPTT server 102 can inform the at least one MCPTT client (101) of the MCPTT group, which is (are) not engaged in the MCPTT emergency group call, about the clearing of the emergency state of the MCPTT client 101 and the in-progress emergency state of the MCPTT group. The MCPTT client (101)-which was in emergency prior to the MCPTT client 101 issuing the emergency indication- and the other MCPTT clients (101) of the MCPTT group can continue to remain engaged in the MCPTT emergency group call, wherein the MCPTT emergency group call was initiated when the MCPTT client (101) had sent an emergency indication to the MCPTT server 102.

In another embodiment, the MCPTT client 101 can send an emergency indication to the MCPTT server 102. The MCPTT client 101 can send the emergency indication when the MCPTT client 101 and other MCPTT clients (101) of the MCPTT group are engaged in a normal MCPTT group call. The MCPTT client 101 can also send the emergency indication to initiate an MCPTT emergency group call. Consider that the MCPTT server 102 had received the emergency indication from the MCPTT client 101 while the other MCPTT clients (101) of the MCPTT group, including the MCPTT client 101, were engaged in the normal MCPTT group call. The MCPTT server 102 is configured to validate the emergency indication by determining that the MCPTT client 101 is authorized to send the emergency indication. The MCPTT server 102 can send a response to the MCPTT client 101, which had declared emergency, about the authorization of the emergency indication and in-progress emergency state of the MCPTT group. The normal MCPTT group call can be upgraded to an MCPTT emergency group call.

The MCPTT server 102 can inform the other MCPTT clients (101) of the MCPTT group, engaged in the normal MCPTT group call, about the indication of emergency from the MCPTT client 101, the authorization of the emergency indication, and the updating of the status of the normal MCPTT group call to an MCPTT emergency group call. The MCPTT server 102 can inform at least one MCPTT client (101) of the MCPTT group, which is (are) not engaged in the MCPTT emergency group call, about the indication of emergency from the MCPTT client 101, the authorization of the emergency indication, and the updating of the status of the normal MCPTT group call to the MCPTT emergency group call.

Consider that the MCPTT server 102 receives the emergency indication from the MCPTT client 101, wherein the MCPTT client 101 intends to initiate an MCPTT emergency group call. The MCPTT server 102 can be configured to validate the authorization of the MCPTT client 101 to send the emergency indication. The MCPTT server 102 allows the initiation of an MCPTT emergency group call. The MCPTT server 102 can send a response to the MCPTT client 101, which had declared emergency, about the authorization of the emergency indication and in-progress emergency state of the MCPTT group.

The MCPTT server 102 can inform the other MCPTT clients (101) of the MCPTT group, about the indication of emergency from the MCPTT client 101, the authorization of the emergency indication, and the initiation of the MCPTT emergency group call. The MCPTT server 102 can inform at least one MCPTT client (101) of the MCPTT group, which is (are) not engaged in initiated the MCPTT emergency group call, about the indication of emergency from the MCPTT client 101, the authorization of the emergency indication, and the initiation of the MCPTT emergency group call.

Consider that the MCPTT client 101, which had earlier declared emergency, is no longer in emergency. The MCPTT client 101 can send an indication to the MCPTT server 102 to clear the emergency state of the MCPTT client 101 or the in-progress emergency state of the MCPTT group. The MCPTT server 102 can receive the indication from the MCPTT client 101 to clear the emergency state of the MCPTT client 101 and the in-progress emergency state of the MCPTT group. The MCPTT server 102 can be configured to determine whether the MCPTT client 101 is authorized to clear the in-progress emergency state of the MCPTT group. If the MCPTT client 101 is authorized, the MCPTT server 102 can cancel the emergency state of the MCPTT client (101) and the in-progress emergency state of the MCPTT group. Further, the MCPTT server 102 can send a response to the MCPTT client 101 about the clearing of the emergency state of the MCPTT client 101 and the in-progress emergency state of the MCPTT group.

The MCPTT server 102 is configured to inform the other MCPTT clients (101) of the MCPTT group, which are engaged in the MCPTT emergency group call, about the clearing of the emergency state of the MCPTT client 101 and the in-progress emergency state of the MCPTT group. The MCPTT server 102 can inform the at least one MCPTT client (101) of the MCPTT group, which is (are) not engaged in the MCPTT emergency group call, about the clearing of the emergency state of the MCPTT client 101 and the in-progress emergency state of the MCPTT group. Once all MCPTT clients (101) are informed about the clearing of the emergency state of the MCPTT client 101 and the in-progress emergency state of the MCPTT group, the initiated MCPTT emergency group call is terminated. If all MCPTT clients (101) of the MCPTT group were engaged in the normal MCPTT call prior to the indication of emergency by the MCPTT client, the MCPTT emergency group call can be converted to a normal MCPTT group call.

In yet another embodiment, the MCPTT client 101 can send an emergency indication to the MCPTT server 102 to cancel the in-progress emergency state of the MCPTT group. Consider that an MCPTT emergency group call has been initiated and the other MCPTT clients (101) are engaged in the MCPTT emergency group call. In this scenario, consider that there is no ongoing communication amongst the MCPTT clients (101) of the MCPTT group. Consider that the MCPTT client 101 of the MCPTT group has detected that there is no ongoing communication amongst the MCPTT clients (101). The MCPTT client 101 is configured to send an indication to the MCPTT server 102 to clear the in-progress emergency state of the MCPTT group.

The MCPTT server 102 can receive the indication and validate the indication by determining that the MCPTT client 101 is configured to send the indication to cancel the in-progress emergency status of the MCPTT group. If the MCPTT server 102 validates the authorization of the MCPTT client 101 to cancel the in-progress emergency status of the MCPTT group, the MCPTT server 102 can send a response to the MCPTT client 101 about the cancelling of the in-progress emergency status of the MCPTT group. The MCPTT server 102 can either determine that the MCPTT emergency group call has terminated or determine there is no ongoing communication between the MCPTT clients (101) of the MCPTT group through the MCPTT emergency group call. The MCPTT server 102 can inform the other MCPTT clients (101) of the MCPTT group about the cancellation of the in-progress emergency status of the MCPTT group.

FIG. 1 shows exemplary units of the system 100, but it is to be understood that other embodiments are not limited thereon. In other embodiments, the system 100 may include less or more number of units. Further, the labels or names of the units of the system 100 are used only for illustrative purpose and does not limit the scope of the invention. One or more units can be combined together to perform same or substantially similar function in the system 100.

FIG. 2 is an example sequence diagram depicting the management of emergency state of an MCPTT client of an MCPTT group, whilst the MCPTT group is in in-progress emergency state, according to embodiments as disclosed herein. The sequence diagram depicts the flow of information exchanged between the MCPTT server and the MCPTT clients when users of multiple MCPTT clients of the MCPTT group get into emergency conditions and have declared emergency by sending emergency and/or alert indications to the MCPTT server through requests.

As depicted in FIG. 2, the MCPTT group comprises four MCPTT clients, viz., MCPTT client-1, MCPTT client-2, MCPTT client-3, and MCPTT client-4. The MCPTT server is identical to the MCPTT server 102. The MCPTT clients of the MCPTT group can be considered to be identical to each other. The MCPTT client-1 (101), the MCPTT client-2 (101), the MCPTT client-3 (101) and the MCPTT client-4 (101), affiliated to the MCPTT group, are authorized to indicate emergency and initiate MCPTT emergency group calls. The MCPTT server (102) can authorize the MCPTT clients (101) of the MCPTT group to declare emergency, if either of the MCPTT client-1 (101), the MCPTT client-2 (101), the MCPTT client-3 (101) and the MCPTT client-4 (101) declare emergency or send emergency indications to the MCPTT server (102).

Consider that an MCPTT user of the MCPTT client-1 (101) gets into an emergency condition. The MCPTT client-1 (101) can indicate emergency by sending emergency indication and/or alert indication SET. The MCPTT group, to which the MCPTT client-1 (101) belongs, is also in emergency and the status of the MCPTT group can be set as "in-progress emergency state" due to the emergency state of the MCPTT client-1 (101). The MCPTT clients (101) of the MCPTT group, i.e., MCPTT client-1 (101), the MCPTT client-2 (101), the MCPTT client-3 (101) and the MCPTT client-4 (101), can communicate with each other using an MCPTT emergency group call. Consider that an MCPTT emergency group call has been initiated after the user of the MCPTT client-1 (101) gets into the emergency condition (after emergency indication is sent, by the MCPTT client-1 (101), to the MCPTT server (102)).

Consider that the MCPTT clients, viz., the MCPTT client-1 (101), the MCPTT client-2 (101), and the MCPTT client-3 (101) are participating in the MCPTT emergency group call, and the MCPTT client-4 (101) is not participating in the MCPTT emergency group call.

Steps 201 and 202: The user of the MCPTT client-2 (101) gets into an emergency condition and sends a RE-INVITE (202) to the MCPTT server (102) through the MCPTT client-2 (101). This can include emergency indication and/or alert indication, wherein the emergency-indication is SET and the alert indication is SET.

Steps 203, 204 and 205: The MCPTT server (102) validates the emergency indication and/or alert indication and the in-progress emergency state of the MCPTT group. The MCPTT server (102) can determine that the MCPTT client-2 (101) is authorized to send the RE-INVITE for indicating (the MCPTT server (102)) that the MCPTT client-2 (101) is in emergency. Once the validation is completed, the emergency and/or alert indications (sent by the MCPTT client-2 (101)) and the in-progress emergency state of the MCPTT group is cached (stored in cache memory) by the MCPTT server (102). The emergency state of the MCPTT client-2 (101) or the MCPTT group can be cached as: outstanding MCPTT client-2 (101)/MCPTT group emergency. The MCPTT server (102) can send a response to the RE-INVITE to the MCPTT client-2 (101) for indicating that the emergency indication and/or the alert indication of the MCPTT client-2 (101) or the MCPTT group is 'true' or SET.

Steps 206, 207 and 208: If an outstanding MCPTT client-(x) (101)/MCPTT group emergency exists, the MCPTT server (102) can send notifications to all affiliated members (MCPTT clients (101)) of the MCPTT group, irrespective of whether the MCPTT clients (101) are participating in the MCPTT emergency group call, about the state of emergency of the MCPTT client-2 (101) and the in-progress emergency state of the MCPTT group due to the state of emergency of the MCPTT client-2 (101). The MCPTT server (102) can send the notifications using Session Initiation Protocol (SIP) MESSAGES.

The MCPTT server (102) can utilize SIP RE-INVITE messages for sending notifications to the participating members (MCPTT client-1 (101) and the MCPTT client-3 (101)) and SIP MESSAGE for sending the notifications to the non-participating members (MCPTT client-4 (101)). The MCPTT server (102) may also utilize other types of SIP messages (such as SIP INFO) for sending the notifications to all affiliated members of the MCPTT group (MCPTT client-1 (101), MCPTT client-3 (101), and MCPTT client-4 (101)). The notifications include the emergency indications, wherein the emergency-indication and/or alert-indications are set to 'true' (SET). At this juncture, users of both the MCPTT client-1 (101) and the MCPTT client-2 (101) are in emergency conditions and are participating in the MCPTT emergency group call.

Steps 209, 210 and 211: The MCPTT clients participating in the MCPTT emergency group call, i.e., the MCPTT client-1 (101) and the MCPTT client-3 (101), and the MCPTT client of the MCPTT group not participating in the MCPTT emergency group call, i.e., the MCPTT client-4 (101), sends, to the MCPTT server (102), responses to the notifications (received from the MCPTT server (102)). In an embodiment, the responses can be sent using SIP messages, which can indicate awareness of the emergency and/or alert indications, pertaining to the emergency indication from the MCPTT client-2 (101), being SET; and of the in-progress emergency state of the MCPTT group.

Steps 212 and 213: The user of the MCPTT client-2 (101) gets out of the emergency condition and sends a request to the MCPTT server (102) using a RE-INVITE message, wherein the request includes emergency indication and/or alert indication. The emergency indication is set to 'false' or RESET and/or the alert indication is set to 'false' or RESET.

Steps 214, 215 and 216: The MCPTT server (102) can validate the request on determining that the MCPTT client-2 (101) is authorized to cancel the emergency state of the MCPTT client-2 (101). Once the validation is completed, the emergency and/or alert indications pertaining to MCPTT client-2 (101) can be RESET. The emergency state of the MCPTT client-2 (101) is 'false' or RESET. In an embodiment, the cached information in the MCPTT server (102)-MCPTT client-2 (101) emergency outstanding-can be cleared. The MCPTT server (102) can send a response to the RE-INVITE request to the MCPTT client-2 (101) for indicating that the emergency state of the MCPTT client-2 (101) is 'false' or RESET or the emergency state of the MCPTT client-2 (101) has been cancelled by the MCPTT server (102).

Steps 217, 218 and 219: The MCPTT server (102) can send notifications to all affiliated members (MCPTT clients (101)) of the MCPTT group, irrespective of whether the MCPTT clients (101) are participating in the MCPTT emergency group call, wherein both the MCPTT client-1 (101) and the MCPTT client-2 (101) were in emergency. The notifications can inform that the emergency and/or alert indications pertaining to the emergency indication from the MCPTT client-2 (101) are RESET and inform about the cancellation of the emergency state of the MCPTT client-2 (101).

In an embodiment, the MCPTT server (102) can send the notifications using SIP MESSAGES. The MCPTT server (102) can utilize a SIP RE-INVITE message for sending the notifications to the participating members (MCPTT client-1 (101) and the MCPTT client-3 (101)) and a SIP MESSAGE for sending the notifications to the nonparticipating members (MCPTT client-4 (101)). The MCPTT server (102) may also utilize other types of SIP messages (such as SIP INFO) for sending the notifications to all affiliated members of the MCPTT group (MCPTT client-1 (101), MCPTT client-3 (101), and MCPTT client-4 (101)). The notifications indicate that the emergency-indication and/or the alert-indications pertaining to the emergency state of the MCPTT client-2 (101) have been set to 'false' (RESET). At this juncture, only the user of the MCPTT client-1 (101) is in emergency. The user of the MCPTT client-2 (101) is no longer in emergency.

Steps 220, 221 and 222: The MCPTT clients i.e., the MCPTT client-1 (101), the MCPTT client-3 (101), and the MCPTT client-4 (101), send, to the MCPTT server (102), responses to the notifications (received from the MCPTT server (102)). In an embodiment, the responses can be sent using SIP messages, which can indicate the awareness of RESET of the emergency and/or alert indications pertaining to the emergency indication from the MCPTT client-2 (101) and cancellation of the emergency state of the MCPTT client-2 (101). The MCPTT emergency group call initiated due to the emergency indication from the MCPTT client-1 can continue and the MCPTT group can continue to be in-progress emergency state.

It is to be noted that each of the MCPTT clients (101) and the MCPTT server (102) can maintain caches, which include information comprising the emergency states of other MCPTT clients (101) or the MCPTT group. The in-progress emergency state of the MCPTT group or the emergency indications from the users of the MCPTT users can be recorded in the caches of the MCPTT clients (101) and the MCPTT server (102). The cached information can be referred for determining whether at least one MCPTT client (101) of the MCPTT group is in emergency. If the caches are cleared, it can be deduced that the users of the at least one MCPTT client (101) are users emergency indications are not empty. If all the outstanding emergency conditions of the users of the MCPTT clients (101) are cancelled, then the in-progress emergency state of the MCPTT group needs be cleared (there are no emergency indications (from the MCPTT clients (101) cached.

FIG. 3 is an example sequence diagram depicting the reporting of emergency state of an MCPTT client (101) and in-progress emergency state of the MCPTT group to another MCPTT client (101) of the MCPTT group that is not participating in an MCPTT emergency group call, according to embodiments as disclosed herein. The sequence diagram depicts the flow of information exchanged between the MCPTT server (102) and the MCPTT clients (101) for reporting emergency indications from the MCPTT clients (101) and the in-progress emergency state of the MCPTT group when the users of the MCPTT clients (101) get into emergency conditions.

As depicted in FIG. 3, four MCPTT clients, viz., the MCPTT client-1 (101), the MCPTT client-2 (101), the MCPTT client-3 (101), and the MCPTT client-4 (101), are affiliated with the MCPTT group. Consider that the MCPTT client-1 (101), the MCPTT client-2 (101), the MCPTT client-3 (101), and the MCPTT client-4 (101), are authorized to indicate emergency and initiate MCPTT emergency group calls.

Step 301: Consider that an MCPTT user of the MCPTT client-2 (101) gets into an emergency condition. The MCPTT client-2 (101) can indicate emergency by sending a (RE)-INVITE or REFER to the MCPTT server (102). This includes an emergency indications and/or an alert indication, wherein the emergency and the alert indications are both SET. When the user of the MCPTT client-2 (101) gets into the emergency condition, the MCPTT group will be in the in-progress emergency state. If there is no communication ongoing between the MCPTT clients (101) of the MCPTT group, an MCPTT emergency group call can be initiated after the user of the MCPTT client-2 (101) gets into the emergency condition and the MCPTT client-2 (101) sends an emergency indication through the request. On the other hand, if the MCPTT clients (101) of the MCPTT group are engaged in a normal MCPTT group call, then the normal MCPTT group call can be converted to an MCPTT emergency group call after the user of the MCPTT client-2 (101) gets into the emergency condition.

Consider that the MCPTT clients, viz., the MCPTT client-1 (101), the MCPTT client-2 (101), and the MCPTT client-3 (101) are participating in the newly initiated MCPTT emergency group call, and the MCPTT client-4 (101) is not participating in the newly initiated MCPTT emergency group call. It is to be noted that the change in the of status of the MCPTT group to the in-progress emergency state, initiation of the MCPTT emergency group call after the user of the MCPTT client-2 (101) gets into the emergency condition, or conversion of the normal MCPTT group call to the MCPTT emergency group call after the user of the MCPTT client-2 (101) gets into the emergency condition, is possible if authorization of the MCPTT client-2 (101)-to declare emergency by sending the emergency indication SET and/or the alert indication SET-is validated by the MCPTT server (102).

Steps 302, 303, and 304: The MCPTT server (102) validates the authorization of the MCPTT client-2 (101) to send emergency indications and/or alert indications, and the in-progress emergency state of the MCPTT group. The MCPTT server (102) can cache the emergency indications from the MCPTT client-2 (101) and the in-progress emergency state of the MCPTT group. The emergency state of the MCPTT client-2 (101) or the MCPTT group is cached as: outstanding MCPTT client-2 (101) or MCPTT group emergency. The MCPTT server (102) can send a response to the (RE)-INVITE or REFER to the MCPTT client-2 (101) for indicating that the emergency indication and/or the alert indication of the MCPTT client-2 (101) or the MCPTT group is 'true' or SET.

Steps 305, 306 and 308: If the MCPTT server (102) is able to determine that the outstanding MCPTT client-(x)/ MCPTT group emergency pertaining to the other MCPTT client(s) (102) does not exist, the MCPTT server (102) can send notifications to the affiliated members (MCPTT client-1 (101), the MCPTT client-2 (101), and the MCPTT client-3 (101)), who are participating in the MCPTT emergency group call; and affiliated members who are not participating in the MCPTT emergency group call (MCPTT client-4 (101)). The MCPTT server (102) can send the notifications to the MCPTT client-1 (101) and the MCPTT client-3 (101) using SIP RE-INVITE messages. The MCPTT server (102) can send the notifications to the members that are not participating in the MCPTT emergency group call (MCPTT client-4 (101)) using a SIP MESSAGE.

The notifications provide information to the MCPTT clients (101) of the MCPTT group about the state of emergency of the MCPTT client-2 (101) and the in-progress emergency state of the MCPTT group due to the state of emergency of the MCPTT client-2 (101). The information in the notifications include the emergency indication from the MCPTT client-2 (101), wherein the both the emergency-indication and the alert-indication are set to 'true' (or SET). At this juncture, the user of the MCPTT client-2 (101) is in emergency condition. The MCPTT client-2 (101) is participating in the MCPTT emergency group call along with the MCPTT client-1 (101) and the MCPTT client-3 (101). The MCPTT client-4 (101) may join the MCPTT emergency group call on receiving the notification from the MCPTT server (101).

Steps 307, 309 and 310: The MCPTT clients participating in the MCPTT emergency group call, i.e., the MCPTT client-1 (101) and the MCPTT client-3 (101); and the MCPTT client of the MCPTT group not participating in the MCPTT emergency group call, i.e., the MCPTT client-4 (101); sends, to the MCPTT server (102), responses to the notifications (received from the MCPTT server (102)). The responses can be sent using SIP MESSAGES, which can indicate the awareness of the MCPTT clients (101) about the state of emergency of the MCPTT client-2 (101) and the in-progress emergency state of the MCPTT group due to the state of emergency of the MCPTT client-2 (101).

Steps 311 and 312: The user of the MCPTT client-2 (101) gets out of the emergency condition and sends a request to the MCPTT server (102) using a RE-INVITE message, wherein the request includes emergency indication and/or alert indication. The emergency indication is set to 'false' or RESET and/or the alert indication is set to 'false' or RESET.

Steps 313, 314 and 315: The MCPTT server (102) can validate the request on determining that the MCPTT client-2 (101) is authorized to cancel the in-progress emergency state of the MCPTT group. Once the validation is completed, the emergency and/or alert indications pertaining to the emergency indications from the MCPTT client-2 (101) are RESET. The emergency state of the MCPTT client-2 (101) is 'false' or RESET and the in-progress emergency state of the MCPTT group is cancelled. In an embodiment, the cached information in the MCPTT server (102)-MCPTT client-2 (101) or MCPTT group emergency outstanding-is cleared. The MCPTT server (102) can send a response to the RE-INVITE request to the MCPTT client-2 (101) for indicating that the emergency state of the MCPTT client-2 (101) is 'false' or RESET and the in-progress emergency state of the MCPTT group has been cancelled.

Steps 316, 317 and 318: The MCPTT server (102) can send notifications to all affiliated members (MCPTT clients (101)) of the MCPTT group, which are participating in the MCPTT emergency group call. The notifications can inform that the emergency and/or alert indications, pertaining to the emergency indication from the MCPTT client-2 (101), are RESET and inform about the cancellation of the in-progress emergency state of the MCPTT group. The MCPTT server (102) can send the notifications using SIP MESSAGES. The MCPTT server (102) can utilize a SIP RE-INVITE message for sending the notifications to the participating members (MCPTT client-1 (101) and the MCPTT client-3 (101)) and a SIP MESSAGE for sending the notifications to the non-participating members (MCPTT client-4 (101)).

The MCPTT server (102) may also utilize other types of SIP messages (such as SIP INFO) for sending the notifications to all affiliated members of the MCPTT group (MCPTT client-1 (101), MCPTT client-3 (101), and MCPTT client-4 (101)). The notifications indicate that the emergency-indication and/or alert-indications are set to 'false' (RESET). At this juncture, the user of the MCPTT client-2 (101) is no longer in emergency.

Steps 319, 320 and 321: The MCPTT clients i.e., the MCPTT client-1 (101), the MCPTT client-3 (101), and the MCPTT client-4 (101), send, to the MCPTT server (102), responses to the notifications (received from the MCPTT server (102)). In an embodiment, the responses can be sent using SIP messages, which can indicate the awareness of RESET of the emergency and/or alert indications pertaining to the emergency indication from the MCPTT client-2 (101) and cancellation of the in-progress emergency state of the MCPTT group. If the MCPTT clients (101) of the MCPTT group were engaged in the normal MCPTT group call prior to the emergency indication from the MCPTT client-2 (101), the MCPTT emergency group call (which was initiated by converting a normal MCPTT call to an MCPTT emergency group call), initiated when the user of the MCPTT client-2 (101) gets into the emergency condition, can be converted back to a normal MCPTT group call.

In an embodiment, if the MCPTT server (102) can detect that requests for cancelling the emergency state(s) of the MCPTT client(s) (101) of the MCPTT group, has been received from other authorized MCPTT client(s) (101) of the MCPTT group, the MCPTT server (102) can send notification(s) to affiliated members (MCPTT client(s) (101)) of the MCPTT group. The notification(s) are sent to the MCPTT client(s) (101) using SIP RE-INVITE message (s), wherein the MCPTT client(s) (101) are participating in an MCPTT emergency group call.

The MCPTT emergency group call may be initiated, or a normal MCPTT group call may be converted to an MCPTT emergency group call, when the at least MCPTT client (101) of the MCPTT group sends an emergency indication and is authorized to send the emergency indication. The notification(s) are sent to the MCPTT client(s) (101) using SIP MESSAGES if the MCPTT client(s) (101) are not participating members of the MCPTT emergency group call. The notification(s) indicate that the emergency-indication(s) and/or alert-indication(s) pertaining to the at least MCPTT client (101) is (are) set as 'false' (RESET). The cached information, i.e., the outstanding MCPTT client-(x)/MCPTT group emergency state, can be cleared. The ongoing MCPTT emergency group call can be downgraded to a normal MCPTT group call.

FIG. 4 is an example sequence diagram depicting the cancelling of in-progress emergency state of the MCPTT group on detecting that there is no active communication between the MCPTT clients (101) of the MCPTT group using an established MCPTT emergency group call, according to embodiments as disclosed herein. The sequence diagram depicts the flow of information exchanged between the MCPTT server (102) and the MCPTT clients (101) for cancelling the in-progress emergency state of the MCPTT group. As depicted in FIG. 4, four MCPTT clients, viz., the MCPTT client-1 (101), the MCPTT client-2 (101), the MCPTT client-3 (101), and the MCPTT client-4 (101), are affiliated with the MCPTT group. Consider that the MCPTT client-1 (101), the MCPTT client-2 (101), the MCPTT client-3 (101), and the MCPTT client-4 (101), are authorized to indicate emergency and initiate MCPTT emergency group calls.

Consider that an MCPTT user of the MCPTT client-1 (101) gets into an emergency condition and sends an emergency indication with emergency indication-SET and/or alert indication SET. The MCPTT server (102) has validated the authorization of the MCPTT client-1 (101) to send the emergency indication. Therefore, the status of the MCPTT group is in-progress emergency. The MCPTT server (102) can cache the emergency state of the MCPTT client-1 (101) and the MCPTT group as: outstanding MCPTT client-1 (101)/MCPTT group emergency. Thereafter, an MCPTT emergency group call can be initiated or an established normal MCPTT group call can be converted to an MCPTT emergency group call. Consider that there is no communication ongoing between the MCPTT clients (101) of the MCPTT group using the MCPTT emergency group call.

Steps 401 and 402: Consider, for example, that the user of the MCPTT client-2 (101) intends to cancel the in-progress emergency state of the MCPTT group. The other MCPTT clients (101) of the MCPTT group can also intend to cancel the in-progress emergency state of the MCPTT group. The MCPTT client-2 (101) can send a request to the MCPTT server (102) with emergency indications, wherein the emergency indication is set to 'false' or RESET and/or the alert indication is set to 'false' or RESET. The emergency indication can be sent to the MCPTT server (102) using a SIP MESSAGE. The MCPTT server (102) can validate the request on determining that the MCPTT client-2 (101) is authorized to cancel the in-progress emergency state of the MCPTT group or the emergency state of the MCPTT client-2 (101).

Steps 403 and 404: Once the validation is completed, the emergency indication and/or alert indication pertaining to the emergency indications from the MCPTT client-2 (101) are RESET and the in-progress emergency state of the MCPTT group is cancelled. In an embodiment, the cached information in the MCPTT server (102)-MCPTT client-2 (101) or MCPTT group emergency outstanding-is cleared. The MCPTT server (102) sends a response to the MCPTT client-2 (101) for indicating that the emergency indications, viz., the emergency indication and/or the alert indication, from the MCPTT client-2 (101), are RESET, and the in-progress emergency state of the MCPTT group has been cancelled. In an embodiment, the MCPTT server (102) can send the response to the MCPTT client-2 (101) using a SIP MESSAGE.

Steps 405, 406 and 407: The MCPTT server (102) can send notifications to all MCPTT clients (101), which are affiliated members of the MCPTT group. The notifications are sent to the MCPTT client-1 (101), the MCPTT client-3 (101), and the MCPTT client-4. The notifications inform that the emergency and/or alert indications, pertaining to the emergency indication from the MCPTT client-2 (101), have been RESET. The notifications also inform that the in-progress emergency state of the MCPTT group has been cancelled. In an embodiment, the MCPTT server (102) sends the notifications using SIP MESSAGES. Thus, the in-progress emergency state of the MCPTT group has been cancelled.

Steps 408, 409 and 410: The MCPTT client-1 (101), the MCPTT client-3 (101), and the MCPTT client-4 (101), can send responses to the notifications received from the MCPTT server (102). In an embodiment, the responses can be sent using SIP messages, which can indicate the awareness of the cancellation of the in-progress emergency state of the MCPTT group. If the MCPTT clients (101) of the MCPTT group were engaged in the normal MCPTT group call prior to the emergency indication from the MCPTT client-1 (101), the MCPTT emergency group call (which was converted to an MCPTT emergency group call), initiated when the user of the MCPTT client-1 (101) gets into the emergency condition, can be converted back to a normal MCPTT group call.

Subclauses as referred to herein can be from existing specification (TS 3GPP 24.379 specification) or from the current document (wherever applicable, according to embodiments as disclosed herein).

Accordingly, the embodiments herein provide in-depth procedure for a method and System to handle user(s) emergency indication while call is in-progress is as described below:

MCPTT In-Progress Emergency Cancel:

This subclause covers both on-demand session and pre-established sessions. Upon receiving a request from an MCPTT user to cancel the in-progress emergency condition on a prearranged MCPTT group, the MCPTT client shall generate a SIP re-INVITE request by following the UE originating session procedures specified in 3GPP TS 24.229, with the clarifications given below.

The MCPTT client:

1) If the MCPTT user is not authorised to cancel the in-progress emergency group state of the MCPTT group as determined by the procedures of subclause 6.2.8.1.7, the MCPTT client:
   a) should indicate to the MCPTT user that they are not authorised to cancel the in-progress emergency group state of the MCPTT group; and
   b) shall skip the remaining steps of the current subclause;

2) shall, if the MCPTT user is cancelling an in-progress emergency condition and optionally an MCPTT emergency alert originated by the MCPTT user, include an application/vnd.3gpp.mcptt-info+xml MIME body populated as specified in subclause 6.2.8.1.3;

3) shall, if the MCPTT user is cancelling an in-progress emergency condition and an MCPTT emergency alert originated by another MCPTT user, include an application/vnd.3gpp.mcptt-info+xml MIME body populated as specified in subclause 6.2.8.1.14;

4) shall include in the application/vnd.3gpp.mcptt-info+xml MIME body with the <mcpttinfo> element containing the <mcptt-Params> element with:
   a) the <session-type> element set to a value of "prearranged"; and
   b) the <mcptt-request-uri> element set to the group identity;

Note 1: The MCPTT ID of the originating MCPTT user is not included in the body, as this will be inserted into the body of the SIP INVITE request that is sent by the originating participating MCPTT function.

5) shall include the g.3gpp.mcptt media feature tag in the Contact header field of the SIP re-INVITE request according to IETF RFC 3840;

6) if the SIP re-INVITE request is to be sent within an on-demand session, shall include in the SIP re-INVITE request an SDP offer according to 3GPP TS 24.229 with the clarifications specified in subclause 6.2.1;

7) if the SIP re-INVITE request is to be sent within a pre-established session, shall include an SDP offer in the SIP re-INVITE request according to 3GPP TS 24.229, based upon the parameters already negotiated for the pre-established session;

Note 2: The SIP re-INVITE request can be sent within an on-demand session or a pre-established session. If the SIP re-INVITE request is sent within a pre-established session, the media-level section for the offered MCPTT speech media stream and the media-level section of the offered media-floor control entity are expected to be the same as was negotiated in the existing pre-established session.

8) shall include a Resource-Priority header field and comply with the procedures in subclause 6.2.8.1.2; and 9) shall send the SIP re-INVITE request according to 3GPP TS 24.229.

On receiving a SIP 2xx response to the SIP re-INVITE request, the MCPTT client:

1) shall interact with the user plane as specified in 3GPP TS 24.380;

2) if the SIP 2xx response to the SIP request for a priority group call does not contain a Warning header field as specified in subclause 4.4 with the warning text containing the mcptt-warn-code set to "149", shall set the MCPTT emergency group state of the group to "MEG 1: no-emergency";

3) if the SIP 2xx response to the SIP request for a priority group call does not contain a Warning header field as specified in subclause 4.4 with the warning text containing the mcptt-warn-code set to "149", shall set the MCPTT emergency group call state of the group to "MEGC 1: emergency-gc-capable"; and 4) if the MCPTT emergency alert state is set to "MEA 4: Emergencyalert-cancel-pending", the sent SIP re-INVITE request did not contain an <originated-by> element in the application/vnd.3gpp.mcptt-info+xml MIME body and the SIP 2xx response to the SIP request for a priority group call does not contain a Warning header field as specified in subclause 4.4 with the warning text containing the mcptt-warn-code set to "149", shall set the MCPTT emergency alert state to "MEA 1: no-alert".

On receiving a SIP INFO request where the Request-URI contains an MCPTT session ID identifying an ongoing group session, the MCPTT client shall follow the actions specified in subclause 6.2.8.1.13 with following clarifications:

1) if the SIP INFO request contains an application/vnd.3gpp.mcptt-info+xml MIME body with an <outstanding-emergency-ind> element set to a value of "true" and the sent SIP re-INVITE request contains an <emergency-ind> element set to a value of "false" in the application/vnd.3gpp.mcptt-info+xml MIME body, the MCPTT client shall set the MCPTT emergency group state of the group to "MEG 1: no-emergency" and shall set the MCPTT emergency group call state of the group to "MEGC 1: emergency-gc-capable".

On receiving a SIP 4xx response, SIP 5xx response or SIP 6xx response to the SIP re-INVITE request:

1) shall set the MCPTT emergency group state as "MEG 2: in-progress";

2) if the SIP 4xx response, SIP 5xx response or SIP 6xx response contains an application/vnd.3gpp.mcptt-info+xml MIME body with an <alert-ind> element set to a value of "true" and the sent SIP re-INVITE request did not contain an <originated-by> element in the application/vnd.3gpp.mcptt-info+xml MIME body, the MCPTT client shall set the MCPTT emergency alert state to "MEA 3: emergency-alert-initiated"; and 3) if the SIP 4xx response, SIP 5xx response or SIP 6xx response did not contain an application/vnd.3gpp.mcptt-info+xml MIME body with an <alert-ind> element and did not contain an <originated-by> element, the MCPTT emergency alert (MEA) state shall revert to its value prior to entering the current procedure.

Note 3: If the in-progress emergency group state cancel request is rejected, the state of the session does not change, i.e. continues with MCPTT emergency group call level priority.

Receipt of a SIP re-INVITE request:

In the procedures in this subclause:

1) emergency indication in an incoming SIP INVITE request refers to the <emergency-ind> element of the application/vnd.3gpp.mcptt-info+xml MIME body; and 2) imminent peril indication in an incoming SIP INVITE request refers to the <imminentperil-ind> element of the application/vnd.3gpp.mcptt-info+xml MIME body.

Upon receipt of a SIP re-INVITE request for an MCPTT session identity identifying an on-demand prearranged MCPTT group session, the controlling MCPTT function:

1) if unable to process the request due to a lack of resources or a risk of congestion exists, may reject the SIP re-INVITE request with a SIP 500 (Server Internal Error) response. The controlling MCPTT function may include a Retry-After header field to the SIP 500 (Server Internal Error) response as specified in IETF RFC 3261 and skip the rest of the steps;

Note 1: If the SIP re-INVITE request contains an application/vnd.3gpp.mcptt-info+xml MIME body with the <emergency-ind> element set to a value of "true", the controlling MCPTT function can choose to accept the request.

2) if received SIP re-INVITE request includes an application/vnd.3gpp.mcptt-info+xml MIME body with an <emergency-ind> element included or an <imminent-peril-ind> element included, shall validate the request as described in subclause 6.3.3.1.17;

3) if the received SIP re-INVITE request contains an unauthorised request for an MCPTT emergency call as determined by subclause 6.3.3.1.13.2:

a) shall reject the SIP re-INVITE request with a SIP 403 (Forbidden) response as specified in subclause 6.3.3.1.14; and b) shall send the SIP 403 (Forbidden) response as specified in 3GPP TS 24.229 and skip the rest of the steps;

4) if the received SIP re-INVITE request contains an imminent peril indication set to "true" for an MCPTT imminent peril group call and this is an unauthorised request for an MCPTT imminent peril group call as determined by subclause 6.3.3.1.13.6, shall reject the SIP re-INVITE request with a SIP 403 (Forbidden) response with the following clarifications:

a) shall include in the SIP 403 (Forbidden) response an application/vnd.3gpp.mcptt-info+xml MIME body as specified in clause F.1 with the <mcpttinfo> element containing the <mcptt-Params> element with the <imminentperil-ind> element set to a value of "false"; and b) shall send the SIP 403 (Forbidden) response as specified in 3GPP TS 24.229 and skip the rest of the steps;

5) if a Resource-Priority header field is included in the received SIP re-INVITE request:

a) if the Resource-Priority header field is set to the value indicated for emergency calls and the SIP re-INVITE request does not contain an emergency indication and the in-progress emergency state of the group is set to a value of "false", shall reject the SIP re-INVITE request with a SIP 403 (Forbidden) response and skip the rest of the steps; and b) if the Resource-Priority header field is set to the value indicated for imminent peril calls and the SIP re-INVITE request does not contain an imminent peril indication and the in-progress imminent peril state of the group is set to a value of "false", shall reject the SIP INVITE request with a SIP 403 (Forbidden) response and skip the rest of the steps;

6) if the received SIP re-INVITE request contains an application/vnd.3gpp.mcptt-info+xml MIME body with the <emergency-ind> element set to a value of "true" and is an authorised request to initiate an MCPTT emergency group call as determined by subclause 6.3.3.1.13.2, the controlling MCPTT function shall:

i) shall cache the MCPTT ID of the MCPTT user that has initiated an MCPTT emergency call i.e. in-progress emergency state;

ii) if the received SIP INVITE contains an alert indication set to a value of "true" and this is an authorised request for an MCPTT emergency alert meeting the conditions specified in subclause 6.3.3.1.13.1, shall cache the MCPTT ID of the MCPTT user that has initiated an MCPTT emergency alert;

iii) if the in-progress emergency state of the group is set to a value of "true" and the another MCPTT user is indicating a new emergency indication:

A) for each of the other affiliated members of the group:

i) shall generate a SIP MESSAGE request notification of the MCPTT user's emergency indication as specified in subclause 6.3.3.1.11;

ii) shall set the <emergency-ind> element of the application/vnd.3gpp.mcptt-info+xml MIME body to a value of "true";

iii) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP re-INVITE request; and iv) if indicated above in step * 6) ii), shall set the <alert-ind> element of the application/vnd.3gpp.mcptt-info+xml MIME body to a value of "true"; and B) send the SIP MESSAGE request as specified in 3GPP TS 24.229; and C) if the in-progress imminent peril state of the group is set to a value of "true", shall set it to a value of "false"; and iv) if the in-progress emergency state of the group is set to a value of "false":

A) shall set the value of the in-progress emergency state of the group to "true";

B) shall start timer TNG2 (in-progress emergency group call timer) and handle its expiry as specified in subclause 6.3.3.1.16;

Note 2: The interactions of TNG2 with the TNG3 (group call timer) are explained in subclause 6.3.3.5.2.

C) shall generate SIP re-INVITE requests for the MCPTT emergency group call to the other participants of the MCPTT group call as specified in subclause 6.3.3.1.6;

D) shall send the SIP re-INVITEs towards the other participants of the MCPTT group call;

E) for each of other affiliated members of the group that are not participating in the call:

i) shall generate a SIP MESSAGE request notification of the MCPTT user's emergency indication as specified in subclause 6.3.3.1.11;

ii) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP re-INVITE request;

iii) shall set the <emergency-ind> element of the application/vnd.3gpp.mcptt-info+xml MIME body to a value of "true";

iv) if indicated above in step * 6) ii), shall set the <alert-ind> element of the application/vnd.3gpp.mcptt-info+xml MIME body to a value of "true"; and v) send the SIP MESSAGE request according to 3GPP TS 24.229; and F) upon receiving a SIP 200 (OK) response to the SIP re-INVITE request the controlling MCPTT function shall interact with the media plane as specified in 3GPP TS 24.380;

7) if the received SIP re-INVITE request contains an application/vnd.3gpp.mcptt-info+xml MIME body with the <emergency-ind> element set to a value of "false" and is an unauthorised request for an MCPTT emergency group call cancellation as determined by subclause 6.3.3.1.13.4:

a) shall reject the SIP re-INVITE request with a SIP 403 (Forbidden) response;

b) shall include in the SIP 403 (Forbidden) response an application/vnd.3gpp.mcptt-info+xml MIME body as specified in annex F.1 with an <emergency-ind> element set to a value of "true";

c) if an <alert-ind> element of the application/vnd.3gpp.mcptt-info+xml MIME body is included in the SIP re-INVITE request set to "false", and there is an outstanding MCPTT emergency alert for the MCPTT user, shall include in the application/vnd.3gpp.mcptt-info+xml MIME body an <alert-ind> element set to a value of "true"; and d) shall send the SIP 403 (Forbidden) response as specified in 3GPP TS 24.229 and skip the rest of the steps;

8) if the received SIP re-INVITE request contains an application/vnd.3gpp.mcptt-info+xml MIME body with the <emergency-ind> element set to a value of "false" and is determined to be an authorised request for an MCPTT emergency call cancellation as specified in subclause 6.3.3.1.16 and the in-progress emergency state of the group to is set to a value of "true" and if cache of the MCPTT ID of the MCPTT users having an outstanding MCPTT emergency group call for only one MCPTT user, the controlling MCPTT function:

a) shall set the in-progress emergency group state of the group to a value of "false";

b) shall clear the cache of the MCPTT ID of the MCPTT user as having an outstanding MCPTT emergency group call;

c) if an <alert-ind> element of the application/vnd.3gpp.mcptt-info+xml MIME body is included and set to "false" and is determined to be an authorised request for an MCPTT emergency alert cancellation as specified in subclause 6.3.3.1.13.3 and there is an outstanding MCPTT emergency alert for the MCPTT user shall:

i) if the received SIP re-INVITE request contains an <originated-by> element in the application/vnd.3gpp.mcptt-info+xml MIME body, clear the cache of the MCPTT ID of the MCPTT user identified by the <originated-by> element as having an outstanding MCPTT emergency alert; or ii) if the received SIP re-INVITE request does not contain an <originated-by> element in the application/vnd.3gpp.mcptt-info+xml MIME body, clear the cache of the MCPTT ID of the sender of the SIP re-INVITE request as having an outstanding MCPTT emergency alert;

d) shall generate SIP re-INVITE requests to the participants in the group call as specified in subclause 6.3.3.1.6. The MCPTT controlling function:

i) for each of the other participants in the group call shall send the SIP re-INVITE request towards the MCPTT client as specified in 3GPP TS 24.229; and ii) Upon receiving a SIP 200 (OK) response to the SIP re-INVITE request the controlling MCPTT function shall interact with the media plane as specified in 3GPP TS 24.380;

Note 3: Subclause 6.3.3.1.6 will inform the group call participants of the cancellation of the MCPTT group's in-progress emergency state and the cancellation of the MCPTT emergency alert if applicable.

e) shall stop timer TNG2 (in-progress emergency group call timer; and

Note 4: The interactions of TNG2 with the TNG3 (group call timer) are explained in subclause 6.3.3.5.2;

f) for each of the affiliated members of the group that are not participating in the call:

i) generate a SIP MESSAGE request notification of the cancellation of the MCPTT user's emergency call as specified in subclause 6.3.3.1.11;

ii) set the <emergency-ind> element of the application/vnd.3gpp.mcptt-info+xml MIME body to a value of "false";

iii) if indicated above in step * 8) ** c), set the <alert-ind> element of the application/vnd.3gpp.mcptt-info+xml MIME body to a value of "false"; and iv) send the SIP MESSAGE request according to 3GPP TS 24.229;

Editor's note: #CR 0xxx, WI MCProtocl7 #it is FFS to determine the authorized user i.e. the user who is cancelling his own emergency conditions declared earlier to the one who is cancelling emergency conditions of others but has not declared his own emergency condition.

9) if the received SIP re-INVITE request contains an application/vnd.3gpp.mcptt-info+xml MIME body with the <emergency-ind> element set to a value of "false" and is determined to be an authorised request for an MCPTT emergency call cancellation as specified in subclause 6.3.3.1.16 and the in-progress emergency state of the group to is set to a value of "true" and if the cache of the MCPTT ID of the MCPTT users having an outstanding MCPTT emergency group call for more than one MCPTT user:

a) shall clear the cache of the MCPTT ID of the MCPTT user as having an outstanding MCPTT emergency group call;

c) if an <alert-ind> element of the application/vnd.3gpp.mcptt-info+xml MIME body is included and set to "false" and is determined to be an authorised request for an MCPTT emergency alert cancellation as specified in subclause 6.3.3.1.13.3 and there is an outstanding MCPTT emergency alert for the MCPTT user shall:

i) if the received SIP re-INVITE request contains an <originated-by> element in the application/vnd.3gpp.mcptt-info+xml MIME body, clear the cache of the MCPTT ID of the MCPTT user identified by the <originated-by> element as having an outstanding MCPTT emergency alert; or ii) if the received SIP re-INVITE request does not contain an <originated-by> element in the application/vnd.3gpp.mcptt-info+xml MIME body, clear the cache of the MCPTT ID of the sender of the SIP re-INVITE request as having an outstanding MCPTT emergency alert;

d) for each of the other affiliated members of the group:

i) generate a SIP MESSAGE request notification of the cancellation of the MCPTT user's emergency alert as specified in subclause 6.3.3.1.11;

ii) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP re-INVITE request;

iii) if the received SIP re-INVITE request contains an <originated-by> element in the application/vnd.3gpp.mcptt-info+xml MIME body, copy the contents of the received <originated-by> element to an <originated-by> element in the application/vnd.3gpp.mcptt-info+xml MIME body in the outgoing SIP MESSAGE request;

iv) if indicated above in step * 9) ** c), set the <alert-ind> element of the application/vnd.3gpp.mcptt-info+xml MIME body to a value of "false"; and v) send the SIP MESSAGE request according to 3GPP TS 24.229; and Editor's note: #CR 0xxx, WI MCProtocl7 #it is FFS to determine the authorize user i.e. the user who is cancelling his own emergency conditions declared earlier to the one who is cancelling emergency conditions of others but has not declared his own emergency condition.

10) if the received SIP re-INVITE request contains an imminent peril indication and the in-progress emergency group state of the group is set to a value of "false", shall perform the procedures specified in subclause 10.1.1.4.8 and skip the rest of the steps.

Upon receiving a SIP 200 (OK) response to a SIP re-INVITE or the another MCPTT user is indicating a new emergency indication set to value "true" or "false" while the in-progress emergency state of the group is set to a value of "true" or request the controlling MCPTT function shall interact with the media plane as specified in 3GPP TS 24.380;

1) shall generate a SIP 200 (OK) response according to rules and procedures of 3GPP TS 24.229;

2) shall include in the SIP 200 (OK) response an SDP answer according to 3GPP TS 24.229 with the clarifications specified in subclause 6.3.3.2.1;

3) shall include the "norefersub" option tag in a Supported header field according to IETF RFC 4488;

4) shall include the "tdialog" option tag in a Supported header field according to IETF RFC 4538;

5) if the received SIP re-INVITE request contains an application/vnd.3gpp.mcptt-info+xml MIME body with the <alert-ind> element set to a value of "true" and if this is an unauthorised request for an MCPTT emergency alert as determined by subclause 6.3.3.1.13.1, shall include in the SIP 200 (OK) response the warning text set to "149 SIP INFO request pending" in a Warning header field as specified in subclause 4.4;

6) if the received SIP re-INVITE request contains an application/vnd.3gpp.mcptt-info+xml MIME body with the <alert-ind> element set to a value of "false" and if this is an unauthorised request for an MCPTT emergency alert cancellation as determined by subclause 6.3.3.1.13.3, shall include in the SIP 200 (OK) response the warning text set to "149 SIP INFO request pending" in a Warning header field as specified in subclause 4.4;

7) if the received SIP re-INVITE request contains an application/vnd.3gpp.mcptt-info+xml MIME body with the <imminentperil-ind> element set to a value of "true", this is an authorized request for an MCPTT imminent peril group call and the in-progress emergency state of the group is set to a value of "true", shall include in the SIP 200 (OK) response the warning text set to "149 SIP INFO request pending" in a Warning header field as specified in subclause 4.4;

Note 5: In this case, the request was for an imminent peril call but a higher priority MCPTT emergency call was already in progress on the group. Hence, the imminent peril call request aspect of the request is denied but the request is granted with emergency level priority.

8) if the received SIP re-INVITE request contains an application/vnd.3gpp.mcptt-info+xml MIME body with the <emergency-ind> element set to a value of "false" and is determined to be an authorised request for an MCPTT emergency call cancellation as specified in subclause 6.3.3.1.16 and the in-progress emergency state of the group to is set to a value of "true" in the controlling MCPTT function and if the cache of the MCPTT ID of the MCPTT users having an outstanding MCPTT emergency group call for more than one MCPTT user, shall include in the SIP 200 (OK) response the warning text set to "149 SIP INFO request pending" in a Warning header field as specified in subclause 4.4;

9) shall interact with media plane as specified in 3GPP TS 24.380; and 10) shall send the SIP 200 (OK) response towards the MCPTT client according to 3GPP TS 24.229.

Upon receiving a SIP ACK to the SIP 200 (OK) response sent towards the inviting MCPTT client, and the SIP 200 (OK) response was sent with the warning text set to "149 SIP INFO request pending" in a Warning header field as specified in subclause 4.4, the controlling MCPTT function shall follow the procedures in subclause 6.3.3.1.18 with following clarifications:

1) if the received SIP re-INVITE request contains an application/vnd.3gpp.mcptt-info+xml MIME body with the <emergency-ind> element set to a value of "false" and is determined to be an authorised request for an MCPTT emergency call cancellation as specified in subclause 6.3.3.1.16 and the in-progress emergency state of the group to is set to a value of "true" in the controlling MCPTT function and if the cache of the MCPTT ID of the MCPTT users having an outstanding MCPTT emergency group call for more than one MCPTT user, shall include an <emergency-ind> element set to a value of "true" and <outstanding-emergency-ind> element set to a value of "true" in the application/vnd.3gpp.mcptt-info+xml MIME body in the outgoing SIP INFO request.

Upon receipt of a SIP 2xx response for an outgoing SIP MESSAGE request, shall handle according to 3GPP TS 24.229.

Handling of a SIP MESSAGE request for emergency alert cancellation:

Upon receipt of a "SIP MESSAGE request for emergency notification for controlling MCPTT function" containing an application/vnd.3gpp.mcptt-info+xml MIME body with the <alert-ind> element set to a value of "false", the controlling MCPTT function:

1) if the received SIP MESSAGE request is an unauthorised request for an MCPTT emergency alert cancellation as specified in subclause 6.3.3.1.13.1:

a) and if the received SIP MESSAGE request does not contain an <emergency-ind> element or is an unauthorised request for an MCPTT emergency call cancellation as specified in subclause 6.3.3.1.13.4, shall reject the SIP MESSAGE request with a SIP 403 (Forbidden) response to the SIP MESSAGE request as specified in 3GPP TS 24.229 with the following clarifications:

i) shall include in the SIP 403 (Forbidden) response an application/vnd.3gpp.mcptt-info+xml MIME body as specified in clause F.1 with the <mcpttinfo> element containing the <mcptt-Params> element with the <alert-ind> element set to a value of "true";

ii) if the received SIP MESSAGE request contains an <emergency-ind> element of the <mcpttinfo> element set to a value of "false" and if the in-progress emergency state of the group is set to a value of "true" and this is an unauthorised request for an MCPTT emergency call cancellation as determined in step i) above, shall include an <emergency-ind> element set to a value of "true" in the application/vnd.3gpp.mcptt-info+xml MIME body in the SIP 403 (Forbidden) response; and iii) shall send the SIP 403 (Forbidden) response according to rules and procedures of 3GPP TS 24.229 and skip the rest of the steps; and b) and if the received SIP MESSAGE request contains an <emergency-ind> element and is an authorised request for an MCPTT emergency call cancellation as specified in subclause 6.3.3.1.13.4 and the in-progress emergency state of the MCPTT group is set to a value of "true" and if cache of the MCPTT ID of the MCPTT users having an outstanding MCPTT emergency group call for only one MCPTT user:

i) shall set the in-progress emergency state of the group to a value of "false";

ii) shall clear the cache of the MCPTT ID of the MCPTT user that triggered the setting of the in-progress emergency state of the MCPTT group to "true";

iii) shall generate SIP re-INVITE requests to the other affiliated and joined members of the MCPTT group as specified in subclause 6.3.3.1.6. The MCPTT controlling function:

A) for each affiliated and joined member shall send the SIP re-INVITE request towards the MCPTT client as specified in 3GPP TS 24.229; and B) Upon receiving a SIP 200 (OK) response to the SIP re-INVITE request the controlling MCPTT function shall interact with the media plane as specified in 3GPP TS 24.380;

iv) for each of the affiliated but not joined members of the group shall:

A) generate a SIP MESSAGE request notification of the cancellation of the MCPTT user's emergency call as specified in subclause 6.3.3.1.11;

B) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP MESSAGE request; and C) shall include an <emergency-ind> element set to a value of "false" in the application/vnd.3gpp.mcptt-info+xml MIME body in the outgoing SIP MESSAGE request;

v) shall generate a SIP 200 (OK) response to the received SIP MESSAGE request as specified in 3GPP TS 24.229;

vi) shall send the SIP 200 (OK) response to the received SIP MESSAGE as specified in 3GPP TS 24.229 and skip the rest of the steps;

vii) shall generate a SIP MESSAGE request as described in subclause 6.3.3.1.20 to indicate successful receipt of the request for emergency alert cancellation viii) shall include in the application/vnd.3gpp.mcptt-info+xml MIME body of the SIP MESSAGE request:

A) the <alert-ind> element set to a value of "true";

B) the <alert-ind-rcvd> element set to a value of true;

C) the <emergency-ind> element set to a value of "false"; and

D) the <mcptt-client-id> element with the MCPTT client ID that was included in the incoming SIP MESSAGE request; and ix) shall send the SIP MESSAGE request according to according to rules and procedures of 3GPP TS 24.229; and c) if the received SIP MESSAGE request contains an <emergency-ind> element and is an authorised request for an MCPTT emergency call cancellation as specified in subclause 6.3.3.1.13.4 and the in-progress emergency state of the MCPTT group is set to a value of "true" and if the cache of the MCPTT ID of the MCPTT users having an outstanding MCPTT emergency group call for more than one MCPTT user:

i) shall clear the cache of the MCPTT ID of the MCPTT user that triggered the setting of the in-progress emergency state of the MCPTT group to "true";

ii) for each of the affiliated members of the group shall:

A) generate a SIP MESSAGE request notification of the cancellation of the MCPTT user's emergency call as specified in subclause 6.3.3.1.11;

B) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP MESSAGE request;

C) shall include an <emergency-ind> element set to a value of "false" in the application/vnd.3gpp.mcptt-info+xml MIME body in the outgoing SIP MESSAGE request; and D) shall send the SIP MESSAGE request according to according to rules and procedures of 3GPP TS 24.229; and iii) shall generate a SIP 200 (OK) response to the received SIP MESSAGE request as specified in 3GPP TS 24.229;

iv) shall send the SIP 200 (OK) response to the received SIP MESSAGE as specified in 3GPP TS 24.229 and skip the rest of the steps;

v) shall generate a SIP MESSAGE request as described in subclause 6.3.3.1.20 to indicate successful receipt of the request for emergency alert cancellation vi) shall include in the application/vnd.3gpp.mcptt-info+xml MIME body of the SIP MESSAGE request:

A) the <alert-ind> element set to a value of "true";

B) the <alert-ind-rcvd> element set to a value of true;

C) the <emergency-ind> element set to a value of "false"; and

D) the <mcptt-client-id> element with the MCPTT client ID that was included in the incoming SIP MESSAGE request; and vii) shall send the SIP MESSAGE request according to according to rules and procedures of 3GPP TS 24.229; and 2) if the received SIP MESSAGE request is an authorised request for an MCPTT emergency alert cancellation as specified in subclause 6.3.3.1.13.1:

a) if the received SIP MESSAGE request contains an <originated-by> element in the application/vnd.3gpp.mcptt-info+xml MIME body, shall clear the cache of the MCPTT ID of the MCPTT user identified by the <originated-by> element as having an outstanding MCPTT emergency alert;

b) if the received SIP MESSAGE request does not contain an <originated-by> element in the application/vnd.3gpp.mcptt-info+xml MIME body, clear the cache of the MCPTT ID of the sender of the SIP MESSAGE request as having an outstanding MCPTT emergency alert;

c) if the received SIP MESSAGE request does not contain an <emergency-ind> element or is an unauthorised request for an MCPTT emergency call cancellation as specified in subclause 6.3.3.1.13.4, for each of the affiliated but not joined members of the group shall:

i) generate a SIP MESSAGE request notification of the cancellation of the MCPTT user's emergency alert as specified in subclause 6.3.3.1.11;

ii) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP MESSAGE request;
iii) if the received SIP MESSAGE request contains an <originated-by> element in the application/vnd.3gpp.mcptt-info+xml MIME body, copy the contents of the received <originated-by> element to an <originated-by> element in the application/vnd.3gpp.mcptt-info+xml MIME body in the outgoing SIP MESSAGE request;
iv) shall include an <alert-ind> element set to a value of "false" in the application/vnd.3gpp.mcptt-info+xml MIME body in the outgoing SIP MESSAGE request; and
v) send the SIP MESSAGE request as specified in 3GPP TS 24.229;
d) if the received SIP MESSAGE request contains an <emergency-ind> element and is an authorised request for an MCPTT emergency call cancellation as specified in subclause 6.3.3.1.13.4 and the in-progress emergency state of the MCPTT group is set to a value of "true" and if cache of the MCPTT ID of the MCPTT users having an outstanding MCPTT emergency group call for only one MCPTT user:
i) shall set the in-progress emergency state of the group to a value of "false";
ii) cache the information that the MCPTT user has cancelled the outstanding in-progress emergency state of the group;
iii) shall generate SIP re-INVITES requests to the other affiliated and joined members of the MCPTT group as specified in subclause 6.3.3.1.6. The MCPTT controlling function:
   A) for each affiliated and joined member shall send the SIP re-INVITE request towards the MCPTT client as specified in 3GPP TS 24.229; and
   B) Upon receiving a SIP 200 (OK) response to the SIP re-INVITE request the controlling MCPTT function shall interact with the media plane as specified in 3GPP TS 24.380; and
iv) for each of the affiliated but not joined members of the group shall:
   A) generate a SIP MESSAGE request notification of the cancellation of the MCPTT user's emergency call as specified in subclause 6.3.3.1.11;
   B) include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP MESSAGE request;
   C) if the received SIP MESSAGE request contains an <originated-by> element in the application/vnd.3gpp.mcptt-info+xml MIME body, copy the contents of the received <originated-by> element to an <originated-by> element in the application/vnd.3gpp.mcptt-info+xml MIME body in the outgoing SIP MESSAGE request;
   D) include in the application/vnd.3gpp.mcptt-info+xml MIME body an <alert-ind> element set to a value of "false"; and
   E) shall include an <emergency-ind> element set to a value of "false" in the application/vnd.3gpp.mcptt-info+xml MIME body in the outgoing SIP MESSAGE request;
e) if the received SIP MESSAGE request contains an <emergency-ind> element and is an authorised request for an MCPTT emergency call cancellation as specified in subclause 6.3.3.1.13.4 and the in-progress emergency state of the MCPTT group is set to a value of "true" and if cache of the MCPTT ID of the MCPTT users having an outstanding MCPTT emergency group call for more than one MCPTT user:
i) shall clear the cache of the MCPTT ID of the MCPTT user as having an outstanding MCPTT emergency group call;
ii) if an <alert-ind> element of the application/vnd.3gpp.mcptt-info+xml MIME body is included and set to "false" and is determined to be an authorised request for an MCPTT emergency alert cancellation as specified in subclause 6.3.3.1.13.3 and there is an outstanding MCPTT emergency alert for the MCPTT user shall:
   A) if the received SIP MESSAGE request contains an <originated-by> element in the application/vnd.3gpp.mcptt-info+xml MIME body, clear the cache of the MCPTT ID of the MCPTT user identified by the <originated-by> element as having an outstanding MCPTT emergency alert; or
   B) if the received SIP MESSAGE request does not contain an <originated-by> element in the application/vnd.3gpp.mcptt-info+xml MIME body, clear the cache of the MCPTT ID of the sender of the MESSAGE request as having an outstanding MCPTT emergency alert;
iii) for each of the other affiliated members of the group:
   A) generate a SIP MESSAGE request notification of the cancellation of the MCPTT user's emergency alert as specified in subclause 6.3.3.1.11;
   B) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP re-INVITE request;
   C) if the received SIP re-INVITE request contains an <originated-by> element in the application/vnd.3gpp.mcptt-info+xml MIME body, copy the contents of the received <originated-by> element to an <originated-by> element in the application/vnd.3gpp.mcptt-info+xml MIME body in the outgoing SIP MESSAGE request;
   D) if indicated above in step * 6) ** e) ii), set the <alert-ind> element of the application/vnd.3gpp.mcptt-info+xml MIME body to a value of "false"; and
   E) send the SIP MESSAGE request according to 3GPP TS 24.229; and
f) shall generate a SIP 200 (OK) response to the received SIP MESSAGE request as specified in 3GPP TS 24.229;
g) shall send the SIP 200 (OK) response to the received SIP MESSAGE as specified in 3GPP TS 24.229.
h) shall generate a SIP MESSAGE request as described in subclause 6.3.3.1.20 to indicate successful receipt of the request for emergency alert cancellation;
i) shall include in the application/vnd.3gpp.mcptt-info+xml MIME body, the <alert-ind> element set to a value of "false" and the <alert-ind-rcvd> set to "true";

j) shall populate the <mcptt-client-id> element with the MCPTT client ID that was included in the incoming SIP MESSAGE request;

k) if the received SIP MESSAGE request contains an <emergency-ind> element of the <mcpttinfo> element set to a value of "false":

i) if this is an authorised request for an MCPTT emergency call cancellation as specified in sub-clause 6.3.3.1.13.4 and as indicated in step * 2) ** d), if cache of the MCPTT ID of the MCPTT users having an outstanding MCPTT emergency group call for only one MCPTT user, shall include an <emergency-ind> element set to a value of "false" in the application/vnd.3gpp.mcptt-info+xml MIME body in the outgoing SIP MESSAGE request;

ii) if this is an authorised request for an MCPTT emergency call cancellation as specified in sub-clause 6.3.3.1.13.4 and as indicated in step * 2) ** e), if cache of the MCPTT ID of the MCPTT users having an outstanding MCPTT emergency group call for more than one MCPTT user, shall include an <emergency-ind> element set to a value of "true" and <outstanding-emergency-ind> element set to a value of "true" in the application/vnd.3gpp.mcptt-info+xml MIME body in the out-going SIP MESSAGE request; and iii) otherwise, if this is an unauthorised request for an MCPTT emergency call cancellation as specified in subclause 6.3.3.1.13.4, and the in-progress emergency state of the group is set to a value of "true", shall include an <emergency-ind> element set to a value of "true" in the application/vnd.3gpp.mcptt-info+xml MIME body in the out-going SIP MESSAGE request; and l) shall send the SIP MESSAGE request according to according to the rules and procedures of 3GPP TS 24.229.

Upon receipt of SIP 2xx responses to the outgoing SIP MESSAGE requests, the controlling MCPTT function shall follow the procedures specified in 3GPP TS 24.229.

F.1.3 Semantic:

The <mcpttinfo> element is the root element of the XML document. The <mcpttinfo> element can contain sub-elements.

Note 1: The sub-elements of the <mcpttinfo> are vali-dated by the <xs:any namespace="##any" processContents="lax" minOccurs="0" maxOccurs="unbounded"/> particle of the <mcpttinfo> element.

If the <mcpttinfo> contains the <mcptt-Params> element then:

1) the <mcptt-access-token>, <mcptt-request-uri>, <mcptt-calling-user-id>, <mcptt-called-party-id>, <mcptt-calling-group-id>, <emergency-ind>, <alert-ind>, <imminentperil-ind>, <originated-by>, <mcptt-client-id>, <functional-alias-URI> and <non-acknowl-edged-user> can be included with encrypted content;

2) for each element in * 1) that is included with content that is not encrypted:
   a) the element has the "type" attribute set to "Normal";
   b) if the element is the <mcptt-request-uri>, <mcptt-calling-user-id>, <mcptt-called-party-id> or <mcptt-calling-group-id>, <originated-by>, <functional-alias-URI> or <non-acknowledged-user> then the <mcpttURl> element is included;

c) if the element is the <mcptt-access-token> or <mcptt-client-id>, then the <mcpttString> element is included; and
   d) if the element is <emergency-ind>, <alert-ind>, <alert-ind-rcvd>, <imminentperil-ind> or <outstand-ing-emergency-ind> elements then the <mcpttBool-ean> element is included;

3) for each element in * 1) that is included with content that is encrypted:
   a) the element has the "type" attribute set to "Encrypted";
   b) the <xenc:EncryptedData> element from the "http://www.w3.org/2001/04/xmlenc#" namespace is included and:
      i) can have a "Type" attribute can be included with a value of "http://www.w3.org/2001/04/xmlenc#Content";
      ii) can include an <EncryptionMethod> element with the "Algorithm" attribute set to value of "http://www.w3.org/2009/xmlencll#aes128-gcm";
      iii) can include a <KeyInfo> element with a <Key-Name> element containing the base 64 encoded XPK-ID; and
      iv) includes a <CipherData> element with a <CipherValue> element containing the encrypted data.

Note 2: When the optional attributes and elements are not included within the <xenc:EncryptedData> element, the information they contain is known to the sender and the receiver by other means.

If the <mcpttinfo> contains the <mcptt-Params> element then:

1) the <mcptt-access-token> can be included with the access token received during authentication procedure as described in 3GPP TS 24.482;

2) the <session-type> can be included with:
   a) a value of "chat" to indicate that the MCPTT client wants to join a chat group call
   b) a value of "prearranged" to indicate the MCPTT client wants to make a prearranged group call;
   c) a value of "private" to indicate the MCPTT client wants to make a private call;
   d) a value of "first-to-answer" to indicate that the MCPTT client wants to make a first-to-answer call; or
   e) a value of "ambient-listening" to indicate the MCPTT client wants to make an ambient listening call;

3) the <mcptt-request-uri> can be included with:
   a) a value set to an MCPTT group ID or temporary MCPTT group ID when the <session-type> is set to a value of "prearranged" or "chat"; and
   b) a value set to the MCPTT ID of the called MCPTT user when the <session-type> is set to a value of "private";

4) the <mcptt-calling-user-id> can be included, set to MCPTT ID of the originating user;

5) the <mcptt-called-party-id> can be included, set to the MCPTT ID of the terminating user;

6) the <mcptt-calling-group-id> can be included to indi-cate the MCPTT group identity to the terminating user;

7) the <required> can be included in a SIP 183 (Session Progress) from a noncontrolling MCPTT function of an MCPTT group to inform the controlling MCPTT func-tion that the group on the non-controlling MCPTT function has group members in the group document which are marked as <on-network-required>, as specified in 3GPP TS 24.481;

8) the <emergency-ind> can be:

a) set to "true" to indicate that the call that the MCPTT client is initiating is an emergency MCPTT call; or b) set to "false" to indicate that the MCPTT client is cancelling an emergency MCPTT call (i.e. converting it back to a non-emergency call)

9) the <alert-ind> can be:

a) set to "true" in an emergency call initiation to indicate that an alert to be sent; or b) set to "false" when cancelling an emergency call which requires an alert to be cancelled also 10) if the <session-type> is set to "chat" or "prearranged":

a) the <imminentperil-ind> can be set to "true" to indicate that the call that the MCPTT client is initiating is an imminent peril group MCPTT call;

11) the <broadcast-ind> can be:

a) set to "true" indicates that the MCPTT client is initiating a broadcast group call; or b) set to "false" indicates that the MCPTT client is initiating a non-broadcast group call;

12) the <mc-org> can be:

a) set to the MCPTT user's Mission Critical Organization in an emergency alert sent by the MCPTT server to terminating MCPTT clients;

13) the <floor-state> can be:

a) set to "floor-idle", if the floor is idle in a non-controlling MCPTT function; or b) set to "floor-taken" if the floor state in a non-controlling MCPTT function is taken;

14) the <associated-group-id>:

a) if the <mcptt-request-uri> element contains a group identity then this element can include an MCPTT group ID associated with the group identity in the <mcptt-request-uri> element. E.g. if the <mcptt-request-uri> element contains a temporary group identity (TGI), then the <associated-group-id> element can contain the constituent MCPTT group ID;

15) the <originated-by>:

a) can be included, set to the MCPTT ID of the originating user of an MCPTT emergency alert when being cancelled by another authorised MCPTT user;

16) the <MKFC-GKTPs>:

a) contains a group key transport payload carrying one or more MKFC(s) and MKFC-ID(s) as described in 3GPP TS 24.481 subclause 7.4, to be used for protection of multicast floor control signalling when the UE operates on the network;

17) the <mcptt-client-id>:

a) can be included, set to the MCPTT client ID of the MCPTT client that originated a SIP INVITE request, SIP REFER request or SIP MESSAGE request;

18) the <alert-ind-rcvd> a) can be set to true and included in a SIP MESSAGE to indicate that the emergency alert or cancellation was received successfully; and 19) the <anyExt> can be included with the following elements not declared in the XML schema:

a) an <ambient-listening-type> of type "xs:string":

i) set to a value of "remote-init" when the listening MCPTT user of an ambient listening call initiates the call; or ii) set to a value of "local-init" when the listened-to MCPTT user of an ambient listening call initiates the call; and b) a <release-reason> of type "xs:string":

i) set to a value of "private-call-expiry" when the ambient listening call is release due to the expiry of the private call timer;

ii) set to a value of "administrator-action" when the ambient listening call is released by an MCPTT administrator;

iii) set to a value of "not selected for call" when the when a dialog is released with an MCPTT client that was not selected as the terminating client of a firstto-answer call;

iv) set to a value of "call-request-for-listened-to-client" when there is a call request targeted to the listened-to client;

v) set to a value of "call-request-initiated-by-listened-to-client" when there is a call request initiated by the listened-to client; or vi) set to a value of "authentication of the MIKEY-SAKE I_MESSAGE failed" by a MCPTT client when the signature of the cannot be verified;

c) a <request-type> of type "xs:string":

i) set to value of "private-call-call-back-request" when a client initiates a private call call-back request;

ii) set to a value of "private-call-call-back-cancel-request" when a client initiates a private call call-back cancel request;

iii) set to a value of "group-selection-change-request" when a client initiates a group selection change request;

iv) set to a value of "remotely-initiated-group-call-request" when a client initiates a remotely initiated group call request; or v) set to a value of "remotely-initiated-private-call-response" when a client responds to a remotely initiated private call request;

d) a <response-type> of type "xs:string":

i) set to a value of "private-call-call-back-response" when a client responds to a private call call-back request;

ii) set to a value of "private-call-call-back-cancel-response" when a client responds to a private call call-back cancel request;

iii) set to a value of "group-selection-change-response" when a client responds to a group selection change request;

iv) set to a value of "remotely-initiated-group-call-response" when a client responds to a remotely initiated call request; or v) set to a value of "remotely-initiated-private-call-response" when a client responds to a remotely initiated private call request;

e) an <urgency indication> of type "xs:string":

(i) set to a value of "low", "normal" or "high" to indicate the urgency of a private call call-back request; and f) a <time-of-request> of type "xs:dateTime":

(i) set to the date and time at which the private call call-back request was initiated, in the form: "YYYY-MM-DDThh:mm:ss" where:

YYYY indicates the year;

MM indicates the month;

DD indicates the day;

T indicates the start of the required time section;

hh indicates the hour;

mm indicates the minute; and ss indicates the second; and g) a <selected-group-change-outcome> of type "xs:string":

i) set to a value of "success" when a client reports that it has successfully changed its selected group as requested by a received group selection change request; or ii) set to a value of "fail" when a client reports that it has failed to change its selected group as requested by a received group selection change request;

h) an <affiliation-required> of type "xs:Boolean":

i) set to a value of "true" when received by a client in a groupselection-change-request indicates that the client needs to affiliate to the specified group;

i) a <remotely-initiated-call-outcome> of type "xs:string":

i) set to a value of "success" when a client reports that it has successfully initiated a call requested by a received remotely initiated call request; or ii) set to a value of "fail" when a client reports that it has failed to initiated a call triggered as requested by a received group selection change request;

j) a <notify-remote-user> of type "xs:Boolean":

i) set to a value of "true" when the remote user is to be notified of a remotely initiated call request; or ii) set to a value of "false" when the remote user is to be notified of a received remotely initiated call request;

k) a <functional-alias-URI> of type "mcpttinfo:contentType" set to a value of the functional alias that is used together with the "mcptt-calling-user-id";

l) an <emergency-alert-area-ind> of type "xs:Boolean":

i) set to a value of "true" when the MCPTT client has entered an emergency alert area; or ii) set to a value of "false" when the MCPTT client has exited an emergency alert area;

m) an <group-geo-area-ind> of type "xs:Boolean":

i) set to a value of "true" when the MCPTT client has entered a group geographic area; or ii) set to a value of "false" when the MCPTT client has exited a group geographic area;

n) one or more <non-acknowledged-user> of type "mcpttinfo:contentType" elements set to the MCPTT IDs of invited members to a group call that have not sent a SIP 200 (OK) response; and o) a <call-to-functional-alias-ind> of type "xs:Boolean":

i) set to a value of "true" when the MCPTT client is using a functional alias to identify the MCPTT IDs of the potential target MCPTT users; or ii) set to a value of "false" when the MCPTT client is using MCPTT IDs to identify the potential target MCPTT users.

p) the <outstanding-emergency-ind> i) can be set to "true" and to indicate that the in-progress emergency state cancellation is processed and in-progress emergency state of the group is still retained as another MCPTT user is having an outstanding MCPTT emergency condition.

Absence of the <emergency-ind>, <alert-ind> and <imminentperil-ind> in a SIP INVITE request indicates that the MCPTT client is initiating a non-emergency private call or non-emergency group call.

Absence of the <broadcast-ind> in a SIP INVITE request indicates that the MCPTT client is initiating a non-broadcast group call.

Absence of the <floor-state> in a SIP 200 (OK) response from the non-controlling MCPTT function indicates that the floor is idle.

Absence of the <call-to-functional-alias-ind> in a SIP INVITE request for a firstto-answer call indicates the use of the MCPTT IDs of the potential target MCPTT users.

The recipient of the XML ignores any unknown element and any unknown attribute.

Accordingly, the embodiments herein provide in-depth procedure for a method and System to cancelling of in-progress emergency group state after call is being ended is as described below:

MCPTT In-Progress Emergency Cancel:

This subclause covers both on-demand session and pre-established sessions.

Upon receiving a request from an MCPTT user to cancel the in-progress emergency condition on a prearranged MCPTT group, the MCPTT client shall generate a SIP re-INVITE request while in an ongoing prearranged group call by following the UE originating session procedures specified in 3GPP TS 24.229, with the clarifications given below, otherwise generate a SIP MESSAGE request by following client procedure of subclause 12.1.1.5 of present document.

The MCPTT client:

1) if the MCPTT user is not authorised to cancel the in-progress emergency group state of the MCPTT group as determined by the procedures of subclause 6.2.8.1.7, the MCPTT client:

a) should indicate to the MCPTT user that they are not authorised to cancel the in-progress emergency group state of the MCPTT group; and b) shall skip the remaining steps of the current subclause;

2) shall, if the MCPTT user is cancelling an in-progress emergency condition and optionally an MCPTT emergency alert originated by the MCPTT user, include an application/vnd.3gpp.mcptt-info+xml MIME body populated as specified in subclause 6.2.8.1.3;

3) shall, if the MCPTT user is cancelling an in-progress emergency condition and an MCPTT emergency alert originated by another MCPTT user, include an application/vnd.3gpp.mcptt-info+xml MIME body populated as specified in subclause 6.2.8.1.14;

4) shall include in the application/vnd.3gpp.mcptt-info+xml MIME body with the <mcpttinfo> element containing the <mcptt-Params> element with:

a) the <session-type> element set to a value of "prearranged"; and b) the <mcptt-request-uri> element set to the group identity;

Note 1: The MCPTT ID of the originating MCPTT user is not included in the body, as this will be inserted into the body of the SIP INVITE request that is sent by the originating participating MCPTT function.

5) shall include the g.3gpp.mcptt media feature tag in the Contact header field of the SIP re-INVITE request according to IETF RFC 3840;

6) if the SIP re-INVITE request is to be sent within an on-demand session, shall include in the SIP re-INVITE request an SDP offer according to 3GPP TS 24.229 with the clarifications specified in subclause 6.2.1;

7) if the SIP re-INVITE request is to be sent within a pre-established session, shall include an SDP offer in the SIP re-INVITE request according to 3GPP TS 24.229, based upon the parameters already negotiated for the pre-established session;

Note 2: The SIP re-INVITE request can be sent within an on-demand session or a pre-established session. If the SIP re-INVITE request is sent within a pre-established session, the media-level section for the offered MCPTT speech media stream and the media-level section of the offered media-floor control entity are expected to be the same as was negotiated in the existing pre-established session.

8) shall include a Resource-Priority header field and comply with the procedures in subclause 6.2.8.1.2; and 9) shall send the SIP re-INVITE request according to 3GPP TS 24.229.

On receiving a SIP 2xx response to the SIP re-INVITE request, the MCPTT client:

1) shall interact with the user plane as specified in 3GPP TS 24.380;

2) shall set the MCPTT emergency group state of the group to "MEG 1: no-emergency";

3) shall set the MCPTT emergency group call state of the group to "MEGC 1: emergency-gc-capable"; and 4) if the MCPTT emergency alert state is set to "MEA 4: Emergency-alert-cancel-pending", the sent SIP re-IN-VITE request did not contain an <originated-by> element in the application/vnd.3gpp.mcptt-info+xml MIME body and the SIP 2xx response to the SIP request for a priority group call does not contain a Warning header field as specified in subclause 4.4 with the warning text containing the mcptt-warn-code set to "149", shall set the MCPTT emergency alert state to "MEA 1: no-alert".

On receiving a SIP INFO request where the Request-URI contains an MCPTT session ID identifying an ongoing group session, the MCPTT client shall follow the actions specified in subclause 6.2.8.1.13.

On receiving a SIP 4xx response, SIP 5xx response or SIP 6xx response to the SIP re-INVITE request:

1) shall set the MCPTT emergency group state as "MEG 2: in-progress";

2) if the SIP 4xx response, SIP 5xx response or SIP 6xx response contains an application/vnd.3gpp.mcptt-info+xml MIME body with an <alert-ind> element set to a value of "true" and the sent SIP re-INVITE request did not contain an <originated-by> element in the application/vnd.3gpp.mcptt-info+xml MIME body, the MCPTT client shall set the MCPTT emergency alert state to "MEA 3: emergency-alert-initiated"; and 3) if the SIP 4xx response, SIP 5xx response or SIP 6xx response did not contain an application/vnd.3gpp.mcptt-info+xml MIME body with an <alert-ind> element and did not contain an <originated-by> element, the MCPTT emergency alert (MEA) state shall revert to its value prior to entering the current procedure.

Note 3: If the in-progress emergency group state cancel request is rejected, the state of the session does not change, i.e. continues with MCPTT emergency group call level priority.

MCPTT Client Receives an MCPTT Emergency Alert or Call Notification:

Upon receipt of a "SIP MESSAGE request for emergency notification", the MCPTT client:

1) if the received SIP MESSAGE request contains an application/vnd.3gpp.mcptt-info+xml MIME body with the <alert-ind> element set to a value of "true", may display to the MCPTT user the functional alias of the originating MCPTT user, if provided, and should display to the MCPTT user an indication of the MCPTT emergency alert and associated information, including:

a) the MCPTT group identity contained in <mcptt-calling-group-id> element application/vnd.3gpp.mcptt-info+xml MIME body;

b) the originator of the MCPTT emergency alert contained in the <mcptt-calling-user-id> element of the application/vnd.3gpp.mcptt-info+xml MIME body; and c) the mission critical organization of the MCPTT emergency alert originator contained in the <mc-org> element of the application/vnd.3gpp.mcptt-info+xml MIME body;

Note 1: This is the case of the MCPTT client receiving the notification of another MCPTT user's emergency alert.

2) if the received SIP MESSAGE request contains an application/vnd.3gpp.mcptt-info+xml MIME body with the <alert-ind> element set to a value of "false":

a) should display to the MCPTT user an indication of the MCPTT emergency alert cancellation and associated information, including:

i) the MCPTT group identity contained in the <mcptt-calling-group-id> element application/vnd.3gpp.mcptt-info+xml MIME body;

ii) the originator of the MCPTT emergency alert contained in:

A) if present, the <originated-by> element of the application/vnd.3gpp.mcptt-info+xml MIME body; or B) the <mcptt-calling-user-id> element of the application/vnd.3gpp.mcptt-info+xml MIME body; and b) if the MCPTT ID contained in the <originated-by> element is the MCPTT ID of the receiving MCPTT user, shall set the MCPTT emergency alert state to "MEA 1: no-alert"; and c) if the received SIP MESSAGE request contains an application/vnd.3gpp.mcptt-info+xml MIME body with the <emergency-ind> element is set to a value of "false":

i) shall set the MCPTT emergency group state to "MEG 1: no-emergency"; and ii) shall set the MCPTT emergency group call state to "MEGC 1: emergency-gc-capable";

Note 2: This is the case of the MCPTT client receiving the notification of the cancellation by a third party of an MCPTT emergency alert. This can be the MCPTT emergency alert of another MCPTT user or the MCPTT emergency alert of the recipient, as determined by the contents of the <originated-by> element. Optionally, notification of the cancellation of the in-progress emergency state of the MCPTT group can be included.

3) if the received SIP MESSAGE request contains an application/vnd.3gpp.mcptt-info+xml MIME body with the <emergency-ind> element set to a value of "true":

a) should display to the MCPTT user an indication of the additional emergency MCPTT user participating in the MCPTT emergency group call including the following if not already displayed as part of step * 1):

i) the MCPTT group identity contained in the <mcptt-calling-group-id> element application/vnd.3gpp.mcptt-info+xml MIME body; and ii) the <mcptt-calling-user-id> element of the application/vnd.3gpp.mcptt-info+xml MIME body;

b) shall set the MCPTT emergency group state to "MEG 2: in-progress" if not already set to that value;

Note 3: This is the case of the MCPTT client receiving notification of an additional MCPTT user in an MCPTT emergency state (i.e., not the MCPTT user that originally triggered the in-progress emergency state of the group) joining the in-progress emergency group call or in the case of MCPTT client not participating in an in-progress emergency group call but affiliated to group to receive notification of an MCPTT users having MCPTT outstanding emergency call. An emergency alert indication, if included, is handled in step * 1).

4) if the received SIP MESSAGE request contains an application/vnd.3gpp.mcptt-info+xml MIME body with the <emergency-ind> element set to a value of "false":

a) should display to the MCPTT user an indication of the cancellation of the in-progress emergency state of the MCPTT group call including the following if not already displayed as part of step * 2):

i) the MCPTT group identity contained in the <mcptt-calling-group-id> element application/vnd.3gpp.mcptt-info+xml MIME body; and ii) the <mcptt-calling-user-id> element of the application/vnd.3gpp.mcptt-info+xml MIME body;

b) shall set the MCPTT emergency group state to "MEG 1: no-emergency" if there are no more MCPTT client having outstanding emergency call; and c) shall set the MCPTT emergency group call state to "MEGC 1: emergency-gc-capable";

Note 4: This is the case of the MCPTT client receiving the notification of the cancellation of the in-progress emergency state of the MCPTT group. In this case, the receiving MCPTT client is affiliated with the MCPTT group but not participating or participating in the session. An emergency alert cancellation, if included, is handled in step * 2).

5) if the received SIP MESSAGE request contains an application/vnd.3gpp.mcptt-info+xml MIME body with the <imminentperil-ind> element set to a value of "true":

a) should display to the MCPTT user an indication of the MCPTT user participating in the MCPTT imminent peril group call including the following if not already displayed as part of step * 1):

i) the MCPTT group identity contained in the <mcptt-calling-group-id> element application/vnd.3gpp.mcptt-info+xml MIME body; and ii) the <mcptt-calling-user-id> element of the application/vnd.3gpp.mcptt-info+xml MIME body; and b) shall set the MCPTT imminent peril group state to "MIG 2: in-progress" if not already set to that value;

Note 5: This is the case of the MCPTT client receiving notification of an additional MCPTT user initiating an imminent peril group call when there is already an in-progress imminent peril state in effect on the group.

6) if the received SIP MESSAGE request contains an application/vnd.3gpp.mcptt-info+xml MIME body with the <imminentperil-ind> element set to a value of "false":

a) should display to the MCPTT user an indication of the cancellation of the in-progress imminent peril state of the MCPTT group including the following if not already displayed as part of step * 2):

i) the MCPTT group identity contained in the <mcptt-calling-group-id> element application/vnd.3gpp.mcptt-info+xml MIME body; and ii) the <mcptt-calling-user-id> element of the application/vnd.3gpp.mcptt-info+xml MIME body;

b) shall set the MCPTT imminent peril group state to "MIG 1: no-imminent-peril"; and c) shall set the MCPTT imminent peril group call state to "MIGC 1: imminent-peril-gc-capable";

Note 6: This is the case of the MCPTT client receiving notification of the cancellation of the in-progress imminent peril state of the group.

7) shall generate a SIP 200 (OK) response according to rules and procedures of 3GPP TS 24.229; and 8) shall send the SIP 200 (OK) response towards the MCPTT server according to rules and procedures of 3GPP TS 24.229.

MCPTT Group In-Progress Emergency Group State Cancel:

Upon receiving a request from an MCPTT user to cancel the in-progress emergency condition on a prearranged MCPTT group on which there is no call is ongoing, the MCPTT client shall generate a SIP MESSAGE request in accordance with 3GPP TS 24.229 and IETF RFC 3428 with the clarifications given below.

Note 1: This SIP MESSAGE request is assumed to be sent out-of-dialog.

The MCPTT client:

1) if the MCPTT user is not authorised to cancel the in-progress emergency group state of the MCPTT group as determined by the procedures of subclause 6.2.8.1.7, the MCPTT client:

a) should indicate to the MCPTT user that they are not authorised to cancel the in-progress emergency group state of the MCPTT group; and b) shall skip the remaining steps of the current subclause;

2) shall include the ICSI value "urn:urn-7:3gpp-service.ims.icsi.mcptt" (coded as specified in 3GPP TS 24.22*9), in a P-Preferred-Service header field according to IETF RFC 6050 in the SIP MESSAGE request;

3) shall include an Accept-Contact header field with the g.3gpp.icsi-ref media feature tag containing the value of "urn:urn-7:3gpp-service.ims.icsi.mcptt" along with the "require" and "explicit" header field parameters according to IETF RFC 3841;

4) may include a P-Preferred-Identity header field in the SIP MESSAGE request containing the public user identity of the originator as specified in 3GPP TS 24.229;

5) shall include an application/vnd.3gpp.mcptt-info+xml MIME body as specified in clause F.1 with the <mcptt-info> element containing the <mcptt-Params> element with:

a) the <mcptt-request-uri> element set to the MCPTT group identity; and b) the <emergency-ind> element set to a value of "false";

6) if the MCPTT user has additionally requested the cancellation of an MCPTT emergency alert originated by MCPTT user, shall include an <alert-ind> element set to a value of "false" in the <mcpttinfo> element containing the <mcptt-Params> element;

7) shall set the Request-URI to the public service identity identifying the participating MCPTT function serving the group identity;

8) if the generated SIP MESSAGE request contains an <alert-ind> element in the application/vnd.3gpp.mcpttinfo+xml MIME body, shall set the MCPTT emergency alert state to "MEA 4: Emergency-alert-cancel-pending"; and 9) shall send the SIP MESSAGE request according to rules and procedures of 3GPP TS 24.229.

On receipt of a SIP MESSAGE request containing an application/vnd.3gpp.mcptt-info+xml MIME body with an <emergency-ind-rcvd> element set to a value of "true" and an <mcptt-client-id> matching the MCPTT client ID included in the sent SIP MESSAGE request:

1) if an <emergency-ind> element is present in the application/vnd.3gpp.mcptt-info+xml MIME body of received SIP MESSAGE request and is set to a value of "false":
   a) shall set the MCPTT emergency group state of the group to "MEG 1: no-emergency".

Note 3: The case where an <emergency-ind> element is set to true is possible but not handled specifically above as it results in no state changes.

2) if the <alert-ind> element in the application/vnd.3gpp.mcptt-info+xml MIME body of the received SIP MESSAGE request is set to a value of "true" and if the MCPTT emergency alert state is set to "MEA 4: Emergency-alert-cancel-pending" and the sent SIP MESSAGE request contain an <alert-ind> element set to value "false" in the application/vnd.3gpp.mcptt-info+xml MIME body, shall set the MCPTT emergency alert state to "MEA 3: emergency-alert-initiated"; and Note 2: It would appear to be an unusual situation for the initiator of an MCPTT emergency alert to not be able to clear their own alert. Nevertheless, an MCPTT user can be configured to be authorised to initiate MCPTT emergency alerts but not have the authority to clear them. Hence, the case is covered here.

3) if the <alert-ind> element in the application/vnd.3gpp.mcptt-info+xml MIME body of the received SIP MESSAGE request is set to a value of "false" and if the MCPTT emergency alert state is set to "MEA 4: Emergency-alert-cancel-pending" and the sent SIP MESSAGE request contain an <alert-ind> element set to value "false" in the application/vnd.3gpp.mcptt-info+xml MIME body, shall:
   a) set the MCPTT emergency alert state to "MEA 1: no-alert"; and
   b) clear the MCPTT emergency state if not already cleared;

On receiving a SIP 4xx response, SIP 5xx response or SIP 6xx response to the sent SIP MESSAGE request:

1) if the received SIP 4xx response, SIP 5xx response or SIP 6xx response contains an application/vnd.3gpp.mcptt-info+xml MIME body as specified in clause F.1 with the <mcpttinfo> element containing the <mcptt-Params> element with the <alert-ind> element set to a value of "true" and the sent SIP MESSAGE request contain an <alert-ind> element set to value "false" in the application/vnd.3gpp.mcptt-info+xml MIME body and the MCPTT emergency alert state is set to "MEA 4: Emergency-alert-cancel-pending", shall set the MCPTT emergency alert state to "MEA 3: emergency-alert-initiated"; and Note 4: In this case, <emergency-ind> element is set to true is possible but not handled specifically above as it results in no state changes.

Receipt of a SIP MESSAGE Request Indicating Successful Delivery of Emergency Notification:

Upon receipt of a SIP MESSAGE request routed to the terminating participating MCPTT function as a result of initial filter criteria with the Request-URI set to the public service identity of the terminating participating MCPTT function and the SIP MESSAGE request contains an application/vnd.3gpp.mcptt-info+xml MIME body with an <alert-ind-rcvd> or <emergency-ind-rcvd> element present, the participating MCPTT function:

1) if unable to process the request due to a lack of resources or a risk of congestion exists, may reject the SIP MESSAGE request with a SIP 500 (Server Internal Error) response. The participating MCPTT function may include a Retry-After header field to the SIP 500 (Server Internal Error) response as specified in IETF RFC 3261 and skip the rest of the steps;

2) shall use the MCPTT ID present in the <mcptt-request-uri> element of the application/vnd.3gpp.mcptt-info+xml MIME body of the incoming SIP MESSAGE request to retrieve the binding between the MCPTT ID and public user identity;

3) if the binding between the MCPTT ID and public user identity does not exist, then the participating MCPTT function shall reject the SIP MESSAGE request with a SIP 404 (Not Foun**d) response. Otherwise, continue with the rest of the steps;

4) shall generate an outgoing SIP MESSAGE request in accordance with 3GPP TS 24.229 and IETF RFC 3428 and:
   a) shall include in the SIP MESSAGE request all Accept-Contact header fields and all Reject-Contact header fields, with their feature tags and their corresponding values along with parameters according to rules and procedures of IETF RFC 3841 that were received (if any) in the incoming SIP MESSAGE request;
   b) shall set the Request-URI of the outgoing SIP MESSAGE request to the public user identity associated to the MCPTT ID of the MCPTT user that was in the Request-URI of the incoming SIP MESSAGE request;
   c) shall copy the contents of the application/vnd.3gpp.mcptt-info+xml MIME body received in the incoming SIP MESSAGE request into an application/vnd.3gpp.mcptt-info+xml MIME body included in the outgoing SIP MESSAGE request; and
   d) shall copy the contents of the P-Asserted-Identity header field of the incoming SIP MESSAGE request to the P-Asserted-Identity header field of the outgoing SIP MESSAGE request; and 5) shall send the SIP MESSAGE request as specified in 3GPP TS 24.229.

Upon receipt of SIP 2xx responses to the outgoing SIP MESSAGE requests, the participating MCPTT function shall follow the procedures specified in 3GPP TS 24.229.

Handling of a SIP MESSAGE Request for Emergency Notification:

Upon receipt of a "SIP MESSAGE request for emergency notification for controlling MCPTT function", the controlling MCPTT function:

1) if unable to process the request due to a lack of resources or a risk of congestion exists, may reject the SIP MESSAGE request with a SIP 500 (Server Internal Error) response. The controlling MCPTT function may include a Retry-After header field to the SIP 500 (Server Internal Error) response as specified in IETF RFC 3261. Otherwise, continue with the rest of the steps;

Note: f..If the SIP MESSAGE request contains an alert indication set to a value of "true", the controlling MCPTT function can, according to local policy, choose to accept the request.

2) shall reject the SIP request with a SIP 403 (Forbidden) response and not process the remaining steps if an Accept-Contact header field does not include the g.3gpp.icsi-ref media feature tag containing the value of "urn:urn-7:3gpp-service.ims.icsi.mcptt";

3) if the received SIP MESSAGE request contains an application/vnd.3gpp.mcptt-info+xml MIME body with the <alert-ind> element set to a value of "false", the <emergency-ind> element present or not and call is ongoing on associated group on which outstanding alert exists, shall perform the procedures specified in subclause 12.1.3.2 and skip the rest of the steps;

3a) if the received SIP MESSAGE request contains an application/vnd.3gpp.mcptt-info+xml MIME body with the <emergency-ind> element set to a value of "false", the <alert-ind> element present or not and no call is ongoing on the group on which in-progress emergency state cancelation request is received, shall perform the procedures specified in subclause 12.1.3.3 and skip the rest of the steps;

4) if the received SIP MESSAGE request contains an application/vnd.3gpp.mcptt-info+xml MIME body with the <alert-ind> element set to a value of "true":

a) if the received SIP MESSAGE request is an unauthorised request for an MCPTT emergency alert as specified in subclause 6.3.3.1.13.1 shall reject the SIP MESSAGE request with a SIP 403 (Forbidden) response to the SIP MESSAGE request as specified in 3GPP TS 24.229 with the following clarifications:

i) shall include in the SIP 403 (Forbidden) response an application/vnd.3gpp.mcptt-info+xml MIME body as specified in clause F.1 with the <mcptt-info> element containing the <mcptt-Params> element with the <alert-ind> element set to a value of "false"; and ii) shall send the SIP 403 (Forbidden) response as specified in 3GPP TS 24.229 and skip the rest of the steps; and b) if the received SIP MESSAGE request is an authorised request for an MCPTT emergency alert as specified in subclause 6.3.3.1.13.1:

i) if the sending MCPTT user identified by the <mcptt-calling-user-id> element included in the application/vnd.3gpp.mcptt-info+xml MIME body is not affiliated with the MCPTT group identified by the <mcptt-request-uri> element of the MIME body as determined by the procedures of subclause 6.3.6:

I) shall check if the MCPTT user is eligible to be implicitly affiliated with the MCPTT group as determined by subclause 9.2.2.3.6;

II) if the MCPTT user is determined not to be eligible to be implicitly affiliated to the MCPTT group shall reject the SIP MESSAGE request with a SIP 403 (Forbidden) response with the warning text set to "120 user is not affiliated to this group" in a Warning header field as specified in subclause 4.4 and skip the rest of the steps below; or III) if the procedures of subclause 9.2.2.3.6 determined the MCPTT user to be eligible to be implicitly affiliated to the MCPTT group shall, perform the implicit affiliation as specified in subclause 9.2.2.3.7;

ii) for each of the other affiliated members of the group:

A) generate an outgoing SIP MESSAGE request notification of the MCPTT user's emergency alert indication as specified in subclause 6.3.3.1.11 with the clarifications of subclause 6.3.3.1.12;

B) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP MESSAGE request; and C) send the SIP MESSAGE request according to according to rules and procedures of 3GPP TS 24.229;

iii) shall generate a SIP 200 (OK) response to the received SIP MESSAGE request as specified in 3GPP TS 24.229 with the following clarifications:

A) shall cache the information that the MCPTT user has initiated an MCPTT emergency alert;

iv) shall send the SIP 200 (OK) response to the received SIP MESSAGE according to rules and procedures of 3GPP TS 24.229.

v) shall generate a SIP MESSAGE request as described in subclause 6.3.3.1.20 to indicate successful receipt of an emergency alert, and shall include in the application/vnd.3gpp.mcptt-info+xml MIME body:

A) the <alert-ind> element set to a value of "true";

B) the <alert-ind-rcvd> element set to a value of true; and

C) the <mcptt-client-id> element with the MCPTT client ID that was included in the incoming SIP MESSAGE request; and vi) shall send the SIP MESSAGE request according to according to rules and procedures of 3GPP TS 24.229.

Upon receipt of SIP 2xx responses to the outgoing SIP MESSAGE requests, the controlling MCPTT function shall follow the procedures specified in 3GPP TS 24.229.

Handling of a SIP MESSAGE Request for In-Progress Emergency Group State Cancellation:

Upon receipt of a "SIP MESSAGE request for emergency notification for controlling MCPTT function" containing an application/vnd.3gpp.mcptt-info+xml MIME body with the <emergency-ind> element set to a value of "false" and no call is ongoing on the group on which in-progress emergency cancellation request is made, the controlling MCPTT function:

1) if the received SIP MESSAGE request is an unauthorised request for an MCPTT in-progress emergency group state cancellation as specified in subclause 6.3.3.1.13.4:

a) and if the received SIP MESSAGE request does not contain an <alert-ind> element or is an unauthorised request for an MCPTT emergency alert cancellation as specified in subclause 6.3.3.1.13.3, shall reject the SIP MESSAGE request with a SIP 403 (Forbidden) response to the SIP MESSAGE request as specified in 3GPP TS 24.229 with the following clarifications:

i) shall include in the SIP 403 (Forbidden) response an application/vnd.3gpp.mcptt-info+xml MIME body as specified in clause F.1 with the <mcpt-tinfo> element containing the <mcptt-Params> element with the <emergency-ind> element set to a value of "true";

ii) if the received SIP MESSAGE request contains an <alert-ind> element of the <mcpttinfo> element set to a value of "false" and this is an unauthorised request for an MCPTT emergency alert cancellation as determined in step ** a) above and the emergency state of the MCPTT user has outstanding emergency state, shall include an <alert-ind> element set to a value of "true" in the application/vnd.3gpp.mcptt-info+xml MIME body in the SIP 403 (Forbidden) response; and iii) shall send the SIP 403 (Forbidden) response according to rules and procedures of 3GPP TS 24.229 and skip the rest of the steps; and b) and if the received SIP MESSAGE request contains an <alert-ind> element set to a value of "false" and is an authorised request for an MCPTT emergency alert cancellation as specified in subclause 6.3.3.1.13.3 and the MCPTT user has outstanding emergency state:

i) shall clear the cache of the MCPTT ID of the MCPTT user that has the outstanding emergency alert state;

ii) for each of the affiliated members of the group, the controlling MCPTT function shall:

A) generate a SIP MESSAGE request notification of the cancellation of the MCPTT user's emergency alert as specified in subclause 6.3.3.1.11;

B) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP MESSAGE request; and C) shall include an <alert-ind> element set to a value of "false" in the application/vnd.3gpp.mcptt-info+xml MIME body in the outgoing SIP MESSAGE request;

D) send the SIP MESSAGE request according to according to rules and procedures of 3GPP TS 24.229;

iii) shall generate a SIP 200 (OK) response to the received SIP MESSAGE request as specified in 3GPP TS 24.229;

iv) shall send the SIP 200 (OK) response to the received SIP MESSAGE as specified in 3GPP TS 24.229 and skip the rest of the steps;

v) shall generate a SIP MESSAGE request as described in subclause 6.3.3.1.20 to indicate successful receipt of the request for emergency alert cancellation vi) shall include in the application/vnd.3gpp.mcptt-info+xml MIME body of the SIP MESSAGE request:

A) the <emergency-ind> element set to a value of "true";

B) the <emergency-ind-rcvd> element set to a value of "true";

C) the <alert-ind> element set to a value of "false"; and

D) the <mcptt-client-id> element with the MCPTT client ID that was included in the incoming SIP MESSAGE request; and vii) shall send the SIP MESSAGE request according to according to rules and procedures of 3GPP TS 24.229; and 2) if the received SIP MESSAGE request is an authorised request for an MCPTT in-progress emergency group state cancellation as specified in subclause 6.3.3.1.13.4:

a) shall set the in-progress emergency state of the group to a value of "false";

b) cache the information that the MCPTT user has cancelled the outstanding in-progress emergency state of the group and clear the cache of the all MCPTT ID of the MCPTT users that triggered the setting of the in-progress emergency state of the MCPTT group to "true";

c) if the received SIP MESSAGE request contains an <alert-ind> element set to a value of "false" and is an authorised request for an MCPTT emergency alert cancellation as specified in subclause 6.3.3.1.13.3 and the MCPTT user has outstanding emergency state, clear the cache of the MCPTT ID of the sender of the SIP MESSAGE request as having an outstanding MCPTT emergency alert;

d) for each of the affiliated members of the group shall:

i) generate a SIP MESSAGE request notification of the cancellation of the MCPTT user's/group emergency state as specified in subclause 6.3.3.1.11;

ii) shall include an <emergency-ind> element set to a value of "false" in the application/vnd.3gpp.mcptt-info+xml MIME body in the outgoing SIP MESSAGE request;

iii) shall include in the application/vnd.3gpp.mcptt-info+xml MIME body with the <mcpttinfo> element containing the <mcptt-Params> element with the <mcptt-calling-user-id> element set to the value of the <mcptt-calling-user-id> element in the received SIP MESSAGE request;

iv) if the received SIP MESSAGE request contains an <alert-ind> element of the <mcpttinfo> element set to a value of "false" and this is an authorised request for an MCPTT emergency alert cancellation as determined in step ** c) above, shall include an <alert-ind> element set to a value of "false" in the application/vnd.3gpp.mcptt-info+xml MIME body in the outgoing SIP MESSAGE request; and v) send the SIP MESSAGE request according to according to rules and procedures of 3GPP TS 24.229;

e) shall generate a SIP 200 (OK) response to the received SIP MESSAGE request as specified in 3GPP TS 24.229;

f) shall send the SIP 200 (OK) response to the received SIP MESSAGE as specified in 3GPP TS 24.229.

g) shall generate a SIP MESSAGE request as described in subclause 6.3.3.1.20 to indicate successful receipt of the request for in-progress emergency group cancellation;

h) shall include in the application/vnd.3gpp.mcptt-info+xml MIME body, the <emergency-ind> element set to a value of "false" and the <emergency-ind-rcvd> set to "true";

i) shall populate the <mcptt-client-id> element with the MCPTT client ID that was included in the incoming SIP MESSAGE request;

j) if the received SIP MESSAGE request contains an <alert-ind> element of the <mcpttinfo> element set to a value of "false":

i) if this is an authorised request for an MCPTT emergency alert cancellation as specified in sub-clause 6.3.3.1.13.3, shall include an <alert-ind> element set to a value of "false" in the application/vnd.3gpp.mcptt-info+xml MIME body in the outgoing SIP MESSAGE request; and ii) otherwise, if this is an unauthorised request for an MCPTT emergency alert cancellation as specified in subclause 6.3.3.1.13.3, shall include an <alert-ind> element set to a value of "true" in the application/vnd.3gpp.mcptt-info+xml MIME body in the outgoing SIP MESSAGE request; and k) shall send the SIP MESSAGE request according to according to the rules and procedures of 3GPP TS 24.229.

Upon receipt of SIP 2xx responses to the outgoing SIP MESSAGE requests, the controlling MCPTT function shall follow the procedures specified in 3GPP TS 24.229.

F.1.3 Semantic:

The <mcpttinfo> element is the root element of the XML document. The <mcpttinfo> element can contain subelements.

Note 1: The subelements of the <mcpttinfo> are validated by the <xs:any namespace="##any" processContents="lax" minOccurs="0" maxOccurs="unbounded"/> particle of the <mcpttinfo> element.

If the <mcpttinfo> contains the <mcpt-Params> element then:

1) the <mcptt-access-token>, <mcptt-request-uri>, <mcptt-calling-user-id>, <mcptt-called-party-id>, <mcptt-calling-group-id>, <emergency-ind>, <alert-ind>, <imminentperil-ind>, <originated-by>, <mcptt-client-id>, <functional-alias-URI> and <non-acknowledged-user> can be included with encrypted content;

2) for each element in * 1) that is included with content that is not encrypted:
   a) the element has the "type" attribute set to "Normal";
   b) if the element is the <mcptt-request-uri>, <mcptt-calling-user-id>, <mcptt-called-party-id> or <mcptt-calling-group-id>, <originated-by>, <functional-alias-URI> or <non-acknowledged-user> then the <mcpttURI> element is included;
   c) if the element is the <mcptt-access-token> or <mcptt-client-id>, then the <mcpttString> element is included; and
   d) if the element is <emergency-ind>, <alert-ind>, <alert-ind-rcvd>, <imminentperil-ind> or <emergency-ind-rcvd> elements then the <mcpttBoolean> element is included;

3) for each element in * 1) that is included with content that is encrypted:
   a) the element has the "type" attribute set to "Encrypted";
   b) the <xenc:EncryptedData> element from the "http://www.w3.org/2001/04/xmlenc#" namespace is included and:
      i) can have a "Type" attribute can be included with a value of "http://www.w3.org/2001/04/xmlenc#Content";
      ii) can include an <EncryptionMethod> element with the "Algorithm" attribute set to value of "http://www.w3.org/2009/xmlenc11#aes128-gcm";
      iii) can include a <KeyInfo> element with a <KeyName> element containing the base 64 encoded XPK-ID; and iv) includes a <CipherData> element with a <CipherValue> element containing the encrypted data.

Note 2: When the optional attributes and elements are not included within the <xenc:EncryptedData> element, the information they contain is known to sender and the receiver by other means.

If the <mcpttinfo> contains the <mcpt-Params> element then:

1) the <mcptt-access-token> can be included with the access token received during authentication procedure as described in 3GPP TS 24.482;

2) the <session-type> can be included with:
   a) a value of "chat" to indicate that the MCPTT client wants to join a chat group call
   b) a value of "prearranged" to indicate the MCPTT client wants to make a prearranged group call;
   c) a value of "private" to indicate the MCPTT client wants to make a private call;
   d) a value of "first-to-answer" to indicate that the MCPTT client wants to make a first-to-answer call; or
   e) a value of "ambient-listening" to indicate the MCPTT client wants to make an ambient listening call;

3) the <mcptt-request-uri> can be included with:
   a) a value set to an MCPTT group ID or temporary MCPTT group ID when the <session-type> is set to a value of "prearranged" or "chat"; and
   b) a value set to the MCPTT ID of the called MCPTT user when the <session-type> is set to a value of "private";

4) the <mcptt-calling-user-id> can be included, set to MCPTT ID of the originating user;

5) the <mcptt-called-party-id> can be included, set to the MCPTT ID of the terminating user;

6) the <mcptt-calling-group-id> can be included to indicate the MCPTT group identity to the terminating user;

7) the <required> can be included in a SIP 183 (Session Progress) from a non-controlling MCPTT function of an MCPTT group to inform the controlling MCPTT function that the group on the non-controlling MCPTT function has group members in the group document which are marked as <on-network-required>, as specified in 3GPP TS 24.481;

8) the <emergency-ind> can be:
   a) set to "true" to indicate that the call that the MCPTT client is initiating is an emergency MCPTT call; or
   b) set to "false" to indicate that the MCPTT client is cancelling an emergency MCPTT call (i.e. converting it back to a non-emergency cal** 1)

9) the <alert-ind> can be:
   a) set to "true" in an emergency call initiation to indicate that an alert to be sent; or
   b) set to "false" when cancelling an emergency call which requires an alert to be cancelled also 10) if the <session-type> is set to "chat" or "prearranged":
    a) the <imminentperil-ind> can be set to "true" to indicate that the call that the MCPTT client is initiating is an imminent peril group MCPTT call;

11) the <broadcast-ind> can be:
    a) set to "true" indicates that the MCPTT client is initiating a broadcast group call; or
    b) set to "false" indicates that the MCPTT client is initiating a non-broadcast group call;

12) the <mc-org> can be:

a) set to the MCPTT user's Mission Critical Organization in an emergency alert sent by the MCPTT server to terminating MCPTT clients;

13) the <floor-state> can be:

a) set to "floor-idle", if the floor is idle in a non-controlling MCPTT function; or b) set to "floor-taken" if the floor state in a non-controlling MCPTT function is taken;

14) the <associated-group-id>:

a) if the <mcptt-request-uri> element contains a group identity then this element can include an MCPTT group ID associated with the group identity in the <mcptt-request-uri> element. E.g. if the <mcptt-request-uri> element contains a temporary group identity (TGI), then the <associated-group-id> element can contain the constituent MCPTT group ID;

15) the <originated-by>:

a) can be included, set to the MCPTT ID of the originating user of an MCPTT emergency alert when being cancelled by another authorised MCPTT user;

16) the <MKFC-GKTPs>:

a) contains a group key transport payload carrying one or more MKFC(s) and MKFC-ID(s) as described in 3GPP TS 24.481 subclause 7.4, to be used for protection of multicast floor control signalling when the UE operates on the network;

17) the <mcptt-client-id>:

a) can be included, set to the MCPTT client ID of the MCPTT client that originated a SIP INVITE request, SIP REFER request or SIP MESSAGE request;

18) the <alert-ind-rcvd> a) can be set to true and included in a SIP MESSAGE to indicate that the emergency alert or cancellation was received successfully; and 19) the <anyExt> can be included with the following elements not declared in the XML schema:

a) an <ambient-listening-type> of type "xs:string":

i) set to a value of "remote-init" when the listening MCPTT user of an ambient listening call initiates the call; or ii) set to a value of "local-init" when the listened-to MCPTT user of an ambient listening call initiates the call; and b) a <release-reason> of type "xs:string":

i) set to a value of "private-call-expiry" when the ambient listening call is release due to the expiry of the private call timer;

ii) set to a value of "administrator-action" when the ambient listening call is released by an MCPTT administrator;

iii) set to a value of "not selected for call" when the when a dialog is released with an MCPTT client that was not selected as the terminating client of a first-to-answer call;

iv) set to a value of "call-request-for-listened-to-client" when there is a call request targeted to the listened-to client;

v) set to a value of "call-request-initiated-by-listened-to-client" when there is a call request initiated by the listened-to client; or vi) set to a value of "authentication of the MIKEY-SAKE I_MESSAGE failed" by a MCPTT client when the signature of the cannot be verified;

c) a <request-type> of type "xs:string":

i) set to value of "private-call-call-back-request" when a client initiates a private call call-back request;

ii) set to a value of "private-call-call-back-cancel-request" when a client initiates a private call call-back cancel request;

iii) set to a value of "group-selection-change-request" when a client initiates a group selection change request;

iv) set to a value of "remotely-initiated-group-call-request" when a client initiates a remotely initiated group call request; or v) set to a value of "remotely-initiated-private-call-response" when a client responds to a remotely initiated private call request;

d) a <response-type> of type "xs:string":

i) set to a value of "private-call-call-back-response" when a client responds to a private call call-back request;

ii) set to a value of "private-call-call-back-cancel-response" when a client responds to a private call call-back cancel request;

iii) set to a value of "group-selection-change-response" when a client responds to a group selection change request;

iv) set to a value of "remotely-initiated-group-call-response" when a client responds to a remotely initiated call request; or v) set to a value of "remotely-initiated-private-call-response" when a client responds to a remotely initiated private call request;

e) an <urgency indication> of type "xs:string":

(i) set to a value of "low", "normal" or "high" to indicate the urgency of a private call call-back request; and f) a <time-of-request> of type "xs:dateTime":

(i) set to the date and time at which the private call call-back request was initiated, in the form: "YYYY-MM-DDThh:mm:ss" where:

YYYY indicates the year;

MM indicates the month;

DD indicates the day;

T indicates the start of the required time section;

hh indicates the hour;

mm indicates the minute; and ss indicates the second; and g) a <selected-group-change-outcome> of type "xs:string":

i) set to a value of "success" when a client reports that it has successfully changed its selected group as requested by a received group selection change request; or ii) set to a value of "fail" when a client reports that it has failed to change its selected group as requested by a received group selection change request;

h) an <affiliation-required> of type "xs:Boolean":

i) set to a value of "true" when received by a client in a group-selection-change-request indicates that the client needs to affiliate to the specified group;

i) a <remotely-initiated-call-outcome> of type "xs:string":

i) set to a value of "success" when a client reports that it has successfully initiated a call requested by a received remotely initiated call request; or

ii) set to a value of "fail" when a client reports that it has failed to initiated a call triggered as requested by a received group selection change request;

j) a <notify-remote-user> of type "xs:Boolean":

i) set to a value of "true" when the remote user is to be notified of a remotely initiated call request; or ii) set to a value of "false" when the remote user is to be notified of a received remotely initiated call request;

k) a <functional-alias-URI> of type "mcpttinfo:contentType" set to a value of the functional alias that is used together with the "mcptt-calling-user-id";

l) an <emergency-alert-area-ind> of type "xs:Boolean":

i) set to a value of "true" when the MCPTT client has entered an emergency alert area; or ii) set to a value of "false" when the MCPTT client has exited an emergency alert area;

m) an <group-geo-area-ind> of type "xs:Boolean":

i) set to a value of "true" when the MCPTT client has entered a group geographic area; or ii) set to a value of "false" when the MCPTT client has exited a group geographic area;

n) one or more <non-acknowledged-user> of type "mcpttinfo:contentType" elements set to the MCPTT IDs of invited members to a group call that have not sent a SIP 200 (OK) response;

o) a <call-to-functional-alias-ind> of type "xs:Boolean":

i) set to a value of "true" when the MCPTT client is using a functional alias to identify the MCPTT IDs of the potential target MCPTT users; or ii) set to a value of "false" when the MCPTT client is using MCPTT IDs to identify the potential target MCPTT users; and p) the <emergency-ind-rcvd> i) can be set to "true" and included in a SIP MESSAGE to indicate that the in-progress emergency cancellation request was received successfully.

Absence of the <emergency-ind>, <alert-ind> and <imminentperil-ind> in a SIP INVITE request indicates that the MCPTT client is initiating a non-emergency private call or non-emergency group call.

Absence of the <broadcast-ind> in a SIP INVITE request indicates that the MCPTT client is initiating a non-broadcast group call.

Absence of the <floor-state> in a SIP 200 (OK) response from the non-controlling MCPTT function indicates that the floor is idle.

Absence of the <call-to-functional-alias-ind> in a SIP INVITE request for a first-to-answer call indicates the use of the MCPTT IDs of the potential target MCPTT users.

The recipient of the XML ignores any unknown element and any unknown attribute.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

FIG. 5 illustrates a terminal according to embodiments of the present disclosure.

Referring to the FIG. 5, the terminal 500 may include a processor 510, a transceiver 520 and a memory 530. However, all of the illustrated components are not essential. The terminal 500 may be implemented by more or less components than those illustrated in FIG. 5. In addition, the processor 510 and the transceiver 520 and the memory 530 may be implemented as a single chip according to another embodiment.

The terminal 500 may correspond to an electronic device for performing operations described above. For example, the terminal 500 may correspond to the MCPTT client 101 illustrated in FIG. 1.

The aforementioned components will now be described in detail.

The processor 510 may include one or more processors or other processing devices that control the proposed function, process, and/or method. Operation of the terminal 500 may be implemented by the processor 510.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the terminal 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

FIG. 6 illustrates a server according to embodiments of the present disclosure.

Referring to the FIG. 6, the MCPTT server 600 may include a processor 610, a transceiver 620 and a memory 630. However, all of the illustrated components are not essential. The MCPTT server 600 may be implemented by more or less components than those illustrated in FIG. 6. In addition, the processor 610 and the transceiver 620 and the memory 630 may be implemented as a single chip according to another embodiment.

The MCPTT server 600 may correspond to an electronic device for performing operations described above. For example, the MCPTT server 600 may correspond to the MCPTT server 102 illustrated in FIG. 1.

The aforementioned components will now be described in detail.

The processor 610 may include one or more processors or other processing devices that control the proposed function, process, and/or method. Operation of the MCPTT server 600 may be implemented by the processor 610.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The embodiments disclosed herein describe methods and systems for managing emergency indications from MCPTT clients of an MCPTT group and managing in-progress emergency status of MCPTT emergency group calls. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiment s without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a mission critical push to talk (MCPTT) server in a wireless communication system, the method comprising:

receiving, from a first MCPTT terminal of a first MCPTT user in an MCPTT group, an emergency indication;

based on the emergency indication, setting an in-progress emergency state of the MCPTT group;

receiving, from a second MCPTT terminal of a second MCPTT user in the MCPTT group, a request to cancel the in-progress emergency state, while no call associated with the in-progress emergency state is ongoing;

identifying whether the request to cancel is an authorized request to cancel the in-progress emergency state; and in case that the request to cancel is the authorized request to cancel the in-progress emergency state, clearing the in-progress emergency state of the MCPTT group.

2. A mission critical push to talk (MCPTT) server in a wireless communication system, the MCPTT server comprising:

a transceiver configured to transmit and receive a signal; and a controller coupled with the transceiver and configured to:

receive, from a first MCPTT terminal of a first MCPTT user in an MCPTT group, an emergency indication, based on the emergency indication, set an in-progress emergency state of the MCPTT group, receive, from a second MCPTT terminal of a second MCPTT user in the MCPTT group, a request to cancel the in-progress emergency state, while no call associated with the in-progress emergency state is ongoing, identify whether the request to cancel is an authorized request to cancel the in-progress emergency state, and in case that the request to cancel is the authorized request to cancel the in-progress emergency state, clear the in-progress emergency state of the MCPTT group.

3. A method performed by a first mission critical push to talk (MCPTT) terminal in a wireless communication system, the method comprising:

generating an emergency indication for setting an in-progress emergency state of an MCPTT group, the first MCPTT terminal of a first MCPTT user being included in the MCPTT group; and transmitting, to an MCPTT server, the emergency indication, wherein a request to cancel the in-progress emergency state is transmitted from a second MCPTT terminal of a second MCPTT user in the MCPTT group to the MCPTT server, while no call associated with the in-progress emergency state of the MCPTT group is ongoing, and wherein in case that the request to cancel is an authorized request to cancel the in-progress emergency state, the in-progress emergency state of the MCPTT group is cleared.

4. A first mission critical push to talk (MCPTT) terminal in a wireless communication system, the first MCPTT terminal comprising:

a transceiver configured to transmit and receive a signal; and a controller coupled with the transceiver and configured to:

generate an emergency indication for setting an in-progress emergency state of an MCPTT group, the first MCPTT terminal of a first MCPTT user being included in the MCPTT group, and transmit, to an MCPTT server, the emergency indication, wherein a request to cancel the in-progress emergency state is transmitted from a second MCPTT terminal of a second MCPTT user in the MCPTT group to the MCPTT server, while no call associated with the in-progress emergency state of the MCPTT group is ongoing, and wherein, in case that the request to cancel is an authorized request to cancel the in-progress emergency state, the in-progress emergency state of the MCPTT group is cleared.

5. The method of claim 1, further comprising:

caching an identifier (ID) of the first MCPTT user;

receiving, from a third MCPTT terminal of a third MCPTT user, a new emergency indication; and transmitting, to an MCPTT terminal of at least one MCPTT user in the MCPTT group, a session initiation protocol (SIP) message to notify the new emergency indication of the third MCPTT user, wherein the SIP message includes an ID of the third MCPTT user.

6. The method of claim 1, further comprising:

in case that the request to cancel is the authorized request to cancel the in-progress emergency state of the MCPTT group, transmitting, to an MCPTT terminal of at least one MCPTT user in the MCPTT group, a session initiation protocol (SIP) message to notify a cancellation of the in-progress emergency state of the MCPTT group.

7. The method of claim 1, further comprising:

in case that the request to cancel is an unauthorized request to cancel the in-progress emergency state of the MCPTT group, identifying whether the request to cancel is an authorized request for an MCPTT emergency alert cancellation;

in case that the request to cancel is an unauthorized request for the MCPTT emergency alert cancellation, rejecting the request to cancel; and in case that the request to cancel is the authorized request for the MCPTT emergency alert cancellation, clearing a cached identifier of an MCPTT user that has outstanding emergency alert state.

8. The method of claim 7, further comprising:

in case that the request to cancel is the authorized request for the MCPTT emergency alert cancellation, transmitting, to an MCPTT terminal of at least one MCPTT user in the MCPTT group, a session initiation protocol (SIP) message to notify a cancellation of the emergency alert of the MCPTT user.

9. The MCPTT server of claim 2, wherein the controller is further configured to:

cache an identifier (ID) of the first MCPTT user, receive, from a third MCPTT terminal of a third MCPTT user, a new emergency indication, and transmit, to an MCPTT terminal of at least one MCPTT user in the MCPTT group, a session initiation protocol (SIP) message to notify the new emergency indication of the third MCPTT user, and wherein the SIP message includes an ID of the third MCPTT user.

10. The MCPTT server of claim 2, wherein, in case that the request to cancel is the authorized request to cancel the in-progress emergency state of the MCPTT group, the controller is further configured to transmit, to an MCPTT terminal of at least one MCPTT user in the MCPTT group, a session initiation protocol (SIP) message to notify a cancellation of the in-progress emergency state of the MCPTT group.

11. The MCPTT server of claim 2, wherein the controller is further configured to:

in case that the request to cancel is an unauthorized request to cancel the in-progress emergency state of the MCPTT group, identify whether the request to cancel is an authorized request for an MCPTT emergency alert cancellation, in case that the request to cancel is an unauthorized request for the MCPTT emergency alert cancellation, reject the request to cancel, and in case that the request to cancel is the authorized request for the MCPTT emergency alert cancellation, clear a cached identifier of an MCPTT user that has outstanding emergency alert state.

12. The MCPTT server of claim 11, wherein, in case that the request to cancel is the authorized request for the MCPTT emergency alert cancellation, the controller is further configured to transmit, to an MCPTT terminal of at least one MCPTT user in the MCPTT group, a session initiation protocol (SIP) message to notify a cancellation of the emergency alert of the MCPTT user.

13. The method of claim 3, further comprising:

receiving, from the MCPTT server, a session initiation protocol (SIP) message to notify a new emergency indication of a third MCPTT user, wherein the SIP message is transmitted based on a transmission of the new emergency indication from a third MCPTT terminal of the third MCPTT user in the MCPTT group to the MCPTT server, wherein an identifier (ID) of the first MCPTT user is cached, and wherein the SIP message includes an ID of the third MCPTT user.

14. The method of claim 3, further comprising:

in case that the request to cancel is the authorized request to cancel the in-progress emergency state of the MCPTT group, receiving, from the MCPTT server, a session initiation protocol (SIP) message to notify a cancellation of the in-progress emergency state of the MCPTT group.

15. The method of claim 3, wherein, in case that the request to cancel is an unauthorized request to cancel the in-progress emergency state of the MCPTT group, and the request to cancel is an unauthorized request for an MCPTT emergency alert cancellation, the request to cancel is rejected, and wherein, in case that the request to cancel is the unauthorized request to cancel the in-progress emergency state of the MCPTT group, and the request to cancel is an authorized request for the MCPTT emergency alert cancellation, a cached identifier of an MCPTT user that has outstanding emergency alert state is cleared.

16. The method of claim 15, further comprising:

in case that the request to cancel is the authorized request for the MCPTT emergency alert cancellation, receiving, from the MCPTT server, a session initiation protocol (SIP) message to notify a cancellation of the emergency alert of the MCPTT user.

17. The first MCPTT terminal of claim 4, wherein the controller is further configured to receive, from the MCPTT server, a session initiation protocol (SIP) message to notify a new emergency indication of a third MCPTT user, wherein the SIP message is transmitted based on a transmission of the new emergency indication from a third MCPTT terminal of the third MCPTT user in the MCPTT group to the MCPTT server, wherein an identifier (ID) of the first MCPTT user is cached, and wherein the SIP message includes an ID of the third MCPTT user.

18. The first MCPTT terminal of claim 4, wherein, in case that the request to cancel is the authorized request to cancel the in-progress emergency state of the MCPTT group, the controller is further configured to receive, from the MCPTT server, a session initiation protocol (SIP) message to notify a cancellation of the in-progress emergency state of the MCPTT group.

19. The first MCPTT terminal of claim 4, wherein, in case that the request to cancel is an unauthorized request to cancel the in-progress emergency state of the MCPTT group, and the request to cancel is an unauthorized request for an MCPTT emergency alert cancellation, the request to cancel is rejected, and wherein, in case that the request to cancel is the unauthorized request to cancel the in-progress emergency state of the MCPTT group, and the request to cancel is an authorized request for the MCPTT emergency alert cancellation, a cached identifier of an MCPTT user that has outstanding emergency alert state is cleared.

20. The first MCPTT terminal of claim 19, wherein, in case that the request to cancel is the authorized request for the MCPTT emergency alert cancellation, the controller is further configured to receive, from the MCPTT server, a session initiation protocol (SIP) message to notify a cancellation of the emergency alert of the MCPTT user.

* * * * *